United States Patent
Kuwata et al.

(10) Patent No.: US 6,621,594 B1
(45) Date of Patent: Sep. 16, 2003

(54) PRINTED DATA CORRECTING DEVICE, PRINTED DATA CORRECTING METHOD, AND SOFTWARE RECORDING MEDIUM ON WHICH PRINTED DATA CORRECTING PROGRAM IS RECORDED

(75) Inventors: Naoki Kuwata, Nagano (JP); Takashi Maruyama, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/230,734

(22) PCT Filed: Jul. 2, 1998

(86) PCT No.: PCT/JP98/02996

§ 371 (c)(1),
(2), (4) Date: May 3, 1999

(87) PCT Pub. No.: WO99/01286

PCT Pub. Date: Jan. 14, 1999

(30) Foreign Application Priority Data

Jul. 4, 1997 (JP) .............................................. 9-179520
Jul. 4, 1997 (JP) .............................................. 9-179521

(51) Int. Cl.⁷ .............................................. B41B 15/00
(52) U.S. Cl. ..................................... 358/3.1; 358/3.21
(58) Field of Search ........................ 358/1.9, 515–520, 358/3.02, 3.06, 3.1, 3.21, 501–502; 382/162–163, 167; 347/1, 5–6

(56) References Cited

U.S. PATENT DOCUMENTS

| | | | | |
|---|---|---|---|---|
| 5,980,012 A | * | 11/1999 | Fujita et al. ..................... | 347/5 |
| 6,038,373 A | * | 3/2000 | Matsumoto et al. ........... | 358/1.9 |
| 6,064,414 A | * | 5/2000 | Kobayashi et al. ........... | 347/172 |
| 6,145,962 A | * | 11/2000 | Kanematsu et al. ............ | 347/3 |
| 6,283,650 B1 | * | 9/2001 | Yamada et al. ........ | 400/120.14 |

FOREIGN PATENT DOCUMENTS

| | | | |
|---|---|---|---|
| JP | 62-184855 A | 8/1987 | |
| JP | 63-153142 | 6/1988 | .............. B41J/3/00 |
| JP | 1-255543 A | 10/1989 | |
| JP | 2-131674 A | 5/1990 | |
| JP | 4-93255 | * 3/1992 | |
| JP | 4-181869 A | 6/1992 | |
| JP | 5-220977 | 8/1993 | ............. B41J/2/205 |
| JP | 6-79853 | 10/1994 | ............. B41J/2/205 |
| JP | 7-67807 | 7/1995 | ............. B41J/2/205 |

OTHER PUBLICATIONS

International Search Report.

* cited by examiner

Primary Examiner—Thomas D. Lee
Assistant Examiner—Stephen Brinich
(74) Attorney, Agent, or Firm—Sughrue Mion, PLLC

(57) ABSTRACT

Although almost the same color reproducibility as with a reference print head has been attained in single-color printing, inconsistency in color reproducibility has occurred in mixed-color printing. Where ejection of color ink or any other recording material for forming dots on such a printer as an ink-jet printer (31) varies due to an instrumental error, it is burdensome to set up a degree of adjustment for correcting inconsistency in each color. In an embodiment of the invention where a degree of adjustment for single color at least is predetermined, a mixed-color order for each dot is judged, and the degree of adjustment for each color is reduced as the mixed-color order increases, or in another embodiment where a degree of adjustment for single color at least is predetermined, a reference color is determined selectively, and the degree of adjustment for each color is reduced according to the optimum degree of reduction, satisfactory color adjustment can be carried out readily even for secondary and tertiary color printing.

16 Claims, 23 Drawing Sheets

FIG. 11

| α | 1.0 | 0.9 | 0.8 | 0.7 | 0.6 |
|---|---|---|---|---|---|
| 0 | 0 | 0 | 0 | 0 | 0 |
| 1 | 0 | 0 | 0 | 0 | 0 |
| 2 | 1 | 1 | 1 | 1 | 1 |
| ⋮ | ⋮ | ⋮ | ⋮ | ⋮ | ⋮ |
| 179 | 159 | 161 | 163 | 165 | 167 |
| 180 | 160 | 162 | 164 | 166 | 168 |
| 181 | 161 | 163 | 165 | 167 | 169 |
| ⋮ | ⋮ | ⋮ | ⋮ | ⋮ | ⋮ |
| 254 | 254 | 254 | 254 | 254 | 254 |
| 255 | 255 | 255 | 255 | 255 | 255 |

FIG. 13

PRINTED DATA CORRECTING DEVICE, PRINTED DATA CORRECTING METHOD, AND SOFTWARE RECORDING MEDIUM ON WHICH PRINTED DATA CORRECTING PROGRAM IS RECORDED

TECHNICAL FIELD

The present invention relates to a print data adjusting system, a print data adjusting method, and a software storage medium containing a print data adjusting program.

BACKGROUND ART

Recent advances in color ink-jet printer technology have made it possible to provide a high level of image definition for printed output of so-called photo-realistic image quality. In a color ink-jet printer capable of delivering such a high level of printout quality, color ink droplets are ejected to form dots of predetermined colors at desired points, thereby producing images in dot matrices. For color image printing, three primary color inks of cyan (C), magenta (M) and yellow (Y) or four color inks of cyan, magenta, yellow plus black (K) are used.

To realize photo-realistic quality, color reproducibility is of critical importance as well as fine dot formation. In the inside of a computer, colors are represented using red-green-blue (RGB) multi-level gradation data, whereas CMYK two-level gradation data is handled on a printer. Therefore, color space conversion and gradation conversion are performed for printout. Namely, in printing, CMYK two-level gradation is used while maintaining colors represented in RGB multi-level gradation on the premise that each dot is colored with specified density.

However, although color reproducibility is maintained with respect to print data on output, a volume per droplet of color ink may be different among print heads due to an instrumental error, resulting in each dot being colored with inconsistent density.

In the above-mentioned color ink-jet printer, if a volume per ink droplet ejected from its print head varies due to an instrumental error, each dot is not colored with specified density to cause a disadvantage of degradation in color reproducibility.

In order to circumvent this disadvantage, the inventors have examined an arrangement in which print data is adjusted in advance to compensate for an instrumental error and then a printing operation is performed according to the print data thus adjusted to improve color reproducibility. In this adjustment of print data, an adjustment table is used. For preparing an adjustment table, a patch pattern is printed in the entire gradation range using a reference print head which ejects each droplet of color ink in a specified reference volume, and also a patch pattern is printed in the entire gradation range using each print head having an instrumental error. Through comparison of patch patterns, error-free patch pattern combinations are determined, and thus a list of error-free patch pattern combinations, i.e., an adjustment table is created.

Although comparison of patch patterns is required, it is impracticable to compare patch patterns for all the colors to be reproduced. Therefore, the inventors have created an adjustment table for each element color. Although almost the same color reproducibility as with the reference print head has been attained in single-color printing, inconsistency has occurred in mixed-color printing.

In view of the foregoing, it is a principal object of the present invention to provide a print data adjusting system, a print data adjusting method, and a software storage medium containing a print data adjusting program for enabling accurate color reproduction regardless of an instrumental error among such parts as print heads.

DISCLOSURE OF THE INVENTION

For use with a printing apparatus which deposits element color recording materials in dot matrices on recording media to produce printed output of color images containing a plurality of element colors according to print data, a print data adjusting system arranged for adjusting print data to compensate for color variation due to inconsistency in quantity of recording materials used, characterized in that a predetermined degree of adjustment for compensating for inconsistency in quantity of each single color used is decreased at the time of color mixing through combinations of element colors to accomplish adjustment of print data.

In accomplishing the above-mentioned object of the present invention and according to claim 1 thereof, there is provided a print data adjusting system, for use with a printing apparatus which deposits element color recording materials in dot matrices on recording media to produce printed output of color images containing a plurality of element colors according to print data, which is capable of adjusting print data to compensate for color variation due to inconsistency in quantity of recording materials used, wherein a predetermined degree of adjustment for compensating for inconsistency in quantity of each single color used is decreased at the time of color mixing through combinations of element colors to accomplish adjustment of print data.

In the above-mentioned aspect of the present invention arranged as defined in claim 1, a predetermined degree of adjustment for compensating for inconsistency in quantity of each single color used is attained to cope with inconsistency in quantity of recording materials used due to an instrumental error among printing apparatus, and then the above degree of adjustment is decreased at the time of color mixing through combinations of element colors in order to adjust print data.

In the result of experiments conducted by the inventors, it has been revealed that a degree of adjustment preset for single-color printing is too large when it is applied to mixed-color printing. Although this phenomenon is considered to occur due to a variety of causes, it may be inferred reasonably that a degree of adjustment for each element color becomes to have an increased effect through color mixing. Therefore, reproducibility in mixed-color printing can be improved by decreasing the degree of adjustment for each element color at the time of color mixing so that it is not used intactly for mixed-color printing. In this case, a mixed-color order is given in a range of a secondary color, tertiary color and so forth. As the mixed-color order increases, an effect corresponding to the degree of adjustment for single color is decreased. It is therefore possible to enhance color reproducibility by decreasing a mixed-color order for each dot to an optimum level.

There are two major applicable techniques for decreasing a degree of adjustment at the time of color mixing. In one of these applicable techniques, an optimum degree of adjustment for each pixel is used. As a concrete example according to claim 2 of the present invention, there is provided a print data adjusting system as claimed in claim 1, which is characterized by degree-of-adjustment memory unit for storing a predetermined degree of adjustment for compensating for inconsistency in quantity of recording material used for each element color, degree-of-adjustment regulating unit for judging a mixed-color order for each dot and regulating the degree of adjustment to decrease to a level lower than in single-color printing when the mixed-color order becomes higher, and first adjustment unit for adjusting print data according to the degree of adjustment thus regulated.

In the above-mentioned aspect of the present invention arranged as defined in claim 2, the degree-of-adjustment memory unit stores a predetermined degree of adjustment for compensating for inconsistency in quantity of recording material used for each element color to cope with inconsistency in quantity of recording material used due to an instrumental error among printing apparatus, and the degree-of-adjustment regulating unit judges a mixed-color order for each dot and decreases the degree of adjustment to a level lower than in single-color printing when the mixed-color order becomes higher. Then, the first adjustment unit adjusts print data according to the degree of adjustment thus regulated.

It is just required for the degree-of-adjustment memory unit to store a predetermined degree of adjustment so that inconsistency in quantity of recording material used for each element color can be compensated for, and degree-of-adjustment provision is implementable in a variety of embodiments. For instance, on the premise that gradation print data is used, a conversion table may be provided for storing conversion data corresponding to each gradation level, or operation parameters may be stored as functions for performing calculation on input of gradation print data. Still more, a merged or compressed form of conversion data may stored instead of individual data items or parameters.

It is just required for the degree-of-adjustment regulating unit to judge a mixed-color order for each dot and decrease the degree of adjustment, and a diversity of techniques are applicable to implementation of mixed-color order judgment. As an example according to claim 3 of the present invention, there is provided a print data adjusting system as claimed in claim 2, wherein the degree-of-adjustment regulating unit is arranged to judge variation in compositional quantity of each element color and recognize that a mixed-color order has the highest value in case of uniform distribution.

In the above-mentioned aspect of the present invention arranged as defined in claim 3, the degree-of-adjustment regulating unit judges variation in compositional quantity of each element color. If respective element colors are almost equal in compositional quantity, they are mixed in a ratio of equivalent values. In this case, it is therefore judged that a mixed-color order is high. For color mixing, if the compositional quantities of other element colors are smaller than that of a certain element color, it is reasonably judged that a mixed-color order is low because of a decrease in the effect of a degree of adjustment. Therefore, in case of uniform distribution in compositional quantities of respective element colors, the highest mixed-color order is recognized through judgment.

A variety of techniques are applicable to determination of variation in compositional quantity of each element color, and it is not necessarily required to adopt a specific approach. As an example of a simplified technique according to claim 4 of the present invention, there is provided a print data adjusting system as claimed in claim 3, wherein the degree-of-adjustment regulating unit is arranged to judge variation in compositional quantity of each element color in accordance with a ratio of the lowest level of compositional quantity of each element color to an average value of compositional quantities of respective element colors.

In the above-mentioned aspect of the present invention arranged as defined in claim 4, the degree-of-adjustment regulating unit determines a ratio of the lowest level of compositional quantity of each element color to an average value of compositional quantities of respective element colors. In principle, a value of ratio is determined by the degree-of-adjustment regulating unit. If there are three element colors, the degree-of-adjustment regulating unit determines a ratio of three times the lowest value to a total value of these colors. Based on the ratio thus attained, a judgment is formed on variation in compositional quantity of each element color.

As to judgment on a mixed-color order by the degree-of-adjustment regulating unit, it is not necessarily required to use compositional quantity. According to claim 5 of the present invention, there is provided a print data adjusting system as claimed in claim 2, wherein the degree-of-adjustment regulating unit is arranged to judge saturation and recognize that a mixed-color order is high if saturation is low.

In the above-mentioned aspect of the present invention arranged as defined in claim 5, the degree-of-adjustment regulating unit judges saturation which has a property analogous to compositional quantity with respect to variability. In most cases, element colors are uniform when saturation is low, and a difference among element colors is large when saturation is high. Therefore, in a situation where saturation can be judged readily, judgment on saturation is applicable as a technique for determining a mixed-color order.

As to determination of a degree of regulation by the degree-of-adjustment regulating unit for decreasing a degree of adjustment for each dot, an arbitrary point of time for determining a degree of regulation may be taken. As an example according to claim 6 of the present invention, there is provided a print data adjusting system as claimed in any one of claims 2 to 5, wherein the degree-of-adjustment regulating unit is arranged to judge a mixed-color order per dot of print data and determine a degree of regulation for each degree of adjustment.

In the above-mentioned aspect of the present invention arranged as defined in claim 6, when each dot of print data is input, the degree-of-adjustment regulating unit judges a mixed-color order and determines a degree of regulation for each degree of adjustment. If print data is input in any unit other than dot, a judgment may be formed on a basis of such a unit of input data. Namely, a degree of adjustment is regulated according to the input flow of print data.

In contrast, as another example according to claim 7 of the present invention, there is provided a print data adjusting system as claimed in any one of claims 2 to 5, wherein the degree-of-adjustment regulating unit is arranged to determine, a degree of regulation in advance for each degree of adjustment in accordance with combinations of respective element colors.

In the above-mentioned aspect of the present invention arranged as defined in claim 7, the degree-of-adjustment regulating unit determines a degree of regulation in advance for each degree of adjustment according to combinations of respective element colors. The degree-of-regulation data thus determined in advance may be provided in a conversion table. If any other conversion table such as a color conversion table is available, the degree-of-regulation data may be incorporated in it so that color conversion and adjustment will be executable through single table reference.

In the other applicable technique for decreasing a degree of adjustment at the time of color mixing, a degree of adjustment for the entire print data is used. As a concrete example according to claim 8 of the present invention, there is provided a print data adjusting system as claimed in claim 1, which is characterized by second adjustment unit for adjusting print data in accordance with a predetermined degree of adjustment for compensating for inconsistency in quantity of recording material used for each element color, and degree-of-adjustment reducing unit for decreasing the degree of adjustment effected by the second adjustment unit to a level lower than in single-color printing at the time of color mixing through combinations of element colors.

In the above-mentioned aspect of the present invention arranged as defined in claim 8, the second adjustment unit adjusts print data in accordance with a predetermined degree of adjustment for compensating for quantity of recording material used for each element color, and according to the print data thus adjusted; the printing apparatus deposits element color recording materials in dot matrices on recording media to produce printed output of color images containing a plurality of element colors. In mixed-color printing through combinations of element colors, the degree-of-adjustment reducing unit decreases the degree of adjustment effected by the second adjustment unit to a level lower than in single-color printing.

In the result of experiments conducted by the inventors, it has been found that a degree of adjustment preset for single-color printing is too large when it is applied to mixed-color printing. Although this phenomenon is considered to occur due to a variety of causes, it may be inferred reasonably that a degree of adjustment for each element color becomes to have an increased effect through color mixing. Therefore, reproducibility in mixed-color printing can be improved by decreasing the degree of adjustment for each element color at the time of color mixing so that it is not used intactly for mixed-color printing.

The second adjustment unit is provided with at least single-color degree-of-adjustment data for each element color, and according to an instruction given by the degree-of-adjustment reducing unit, a degree of adjustment for each element color is decreased to adjust print data. Each print data may be adjusted individually, or if a conversion table to be referenced for print data is available, the contents of the conversion table maybe adjusted globally in advance so that color conversion and adjustment will be carried out by referencing the conversion table in each case.

It is just required for the degree-of-adjustment reducing unit to resultantly decrease a degree of adjustment effected by the second adjustment unit to a level lower than in single-color printing at the time of color mixing, and a degree of reduction is not uniform among respective cases. As an example according to claim 9 of the present invention, there is provided a print data adjusting system as claimed in claim 8, wherein the degree-of-adjustment reducing unit is arranged to decrease each degree of adjustment as the number of mixed colors increases.

In the above-mentioned aspect of the present invention arranged as defined in claim 9, the degree-of-adjustment reducing unit decreases a degree of adjustment as the number of mixed colors is increased.

If single-color adjustment setting is used for mixed-color printing, inconsistency takes place since a degree of adjustment for single-color printing is too large for mixed-color printing. Based on this principle, it is advantageous to decrease a degree of adjustment with an increase in the number of mixed colors.

In reduction of a degree of adjustment, the approach mentioned above is to be taken. Actually, however, there are situations including single-color printing and mixed-color printing in various numbers of colors. Therefore, a conditioning operation is required when determining a degree of adjustment. As a preferable example according to claim 10 of the present invention, there is provided a print data adjusting system as claimed in claim 8 or 9, wherein the degree-of-adjustment reducing unit includes degree-of-reduction memory unit for storing an optimum degree of reduction for a particular number of mixed colors and degree-of-reduction weighted addition unit for counting the number of mixed color pixels and performing addition on each degree, of reduction using a weight value corresponding to the number of pixels.

In the above-mentioned aspect of the present invention arranged as defined in claim 10, the degree-of-reduction memory unit stores an optimum degree of reduction for a particular number of mixed colors, and the degree-of-reduction weighted addition unit counts the number of mixed color pixels and performs addition on each degree of reduction-using a weight value corresponding to the number of pixels.

Accordingly, for each number of mixed colors, an optimum degree of reduction is added with a weight value corresponding to a pixel count ratio, thereby making it possible to provide a suitable degree of reduction in terms of the entire printed output.

In implementation of the above-mentioned technique for reducing a degree of adjustment preset for each element color at the time of color mixing, it is not necessarily required to use a substantial apparatus. As an example according to claim 11 of the present invention, there is provided a method of adjusting print data, for use with a printing apparatus which deposits element color recording materials in dot matrices on recording media to produce printed output of color images containing a plurality of element colors according to print data, which is characterized in that a predetermined degree of adjustment for compensating for inconsistency in quantity of each single color used is decreased at the time of color mixing through combinations of element colors to accomplish adjustment of print data.

In attaining an optimum degree of adjustment for each pixel and according to claim 12 of the present invention, there is provided a method of adjusting print data as claimed in claim 11, wherein a predetermined degree of adjustment for compensating for inconsistency in quantity of recording material used for each element color is stored, a mixed-color order for each dot is judged, the degree of adjustment is regulated to decrease to a level lower than in single-color printing when the mixed-color order becomes higher, and print data is adjusted in accordance with the degree of adjustment thus regulated.

Further, in attaining a suitable degree of adjustment in terms of the entire printed output and according to claim 13 of the present invention, there is provided a method of adjusting print data as claimed in claim 11, wherein a predetermined degree of adjustment for compensating for inconsistency in quantity of recording material used for each element color is set up, and the degree of adjustment is decreased to a level lower than in single-color printing at the time of color mixing through combinations of element colors to accomplish adjustment of print data.

Namely, it is not necessarily required to use a substantial apparatus for adjustment of print data, and a method of adjusting print data as mentioned above may be used.

As set forth above, a print data adjusting system arranged to adjust print data may be provided discretely, or it may be incorporated in a certain apparatus. It is to be understood that the essential concept of the present invention covers a variety of embodiments, and there may be provided a print data adjusting system.implemented in hardware or software.

Where the present invention is implemented in a form of color adjusting software as an exemplary embodiment of the essential concept thereof, it is obvious that a software storage medium may be used for containing the color adjusting software.

As an example according to claim 14 of the present invention, there is provided a software storage medium containing a print data adjusting program, for use with a printing apparatus which deposits element dolor recording materials in dot matrices on recording media to produce printed output of color images containing a plurality of element colors according to print data, which is capable of adjusting print data to compensate for color variation due to inconsistency in quantity of recording materials used, wherein a predetermined degree of adjustment for compensating for inconsistency in quantity of each single color used is decreased at the time of color mixing through combinations of element colors to accomplish adjustment of print data.

In attaining an optimum degree of adjustment for each pixel and according to claim 15 of the present invention, there is provided a software storage medium containing a print data adjusting program as claimed in claim 14, wherein a predetermined degree of adjustment for compensating for inconsistency in quantity of recording material used for each element color is stored, a mixed-color order for each dot is judged, the degree of adjustment is regulated to decrease to a level lower than in single-color printing when the mixed-color order becomes higher, and print data is adjusted in accordance with the degree of adjustment thus regulated.

Further, in attaining a suitable degree of adjustment in terms of the entire printed output and according to claim 16 of the present invention, there is provided a software storage medium containing a print data adjusting program as claimed in claim 14, wherein a predetermined degree of adjustment for compensating for inconsistency in quantity of recording material used for each element color is set up, and the degree of adjustment is decreased to a level lower than in single-color printing at the time of color mixing through combinations of element colors to accomplish adjustment of print data.

It is to be understood that a software storage medium for holding the print data adjusting program may be a magnetic storage medium, a magneto-optical storage medium or any software storage medium to be developed in the future. Obviously, the print data adjusting program according to the present invention may take such a replicated form as a primary replicated product, secondary replicated product, etc. In addition, the print data adjusting program according to the present invention may be supplied through use of a communication line or in a form of contents written in a semiconductor chip.

Still more, in view of the essential concept of the present invention, there may be provided such an arrangement that some parts of the present invention are embodied in software while the other parts thereof are embodied in hardware. In a modified embodiment of the present invention, some parts thereof may be formed as software recorded on a storage medium to be read into hardware as required.

As mentioned hereinabove, the present invention provides a print data adjusting system which is capable of eliminating color variation due to an instrumental error among printing apparatus by reducing a degree of adjustment at the time of color mixing, thereby improving color reproducibility.

Further, according to claim 2 of the present invention, a degree of adjustment is set up for each element color, thereby eliminating difficulty in determining a degree of adjustment for color mixing.

Moreover, according to claim 3 of the present invention, a mixed-color order is determined by making reference to compositional quantity of each element color and it is therefore possible to judge the number of mixed colors and a degree of effect thereof, enabling improvement in color reproducibility.

Still more, according to claim 4 of the present invention, variation in compositional quantity of each element color can be figured out through relatively simple calculation.

Furthermore, according to claim 5 of the present invention, a mixed-color order is determined using saturation which is one of characteristics in color reproduction, thereby providing suitability in a situation where saturation is evaluated for any other purpose.

Still further, according to claim 6 of the present invention, a degree of regulation is determined for each dot and calculation is performed only for necessary colors, i.e., there is no need for determining a degree of regulation as to unused colors. In particular, the amount of calculation can be reduced by caching the result thereof.

Moreover, according to claim 7 of the present invention, a degree of regulation is determined in advance and a conversion table is prepared. Thereafter, it is just required to make reference to the conversion table, and if the conversion table is incorporated in any other conversion table, the number of reference sequences can be reduced in total.

Still more, according to claim 8 of the present invention, since a degree of adjustment is set up for each element color, it is possible to obviate difficulty in determining a degree of adjustment for color mixing.

Furthermore, according to claim 9 of the present invention, a degree of adjustment is decreased as the number of mixed colors is increased. Thus, a degree of adjustment for each single color is reduced in color mixing, realizing satisfactory color reproducibility.

Still further, according to claim 10 of the present invention, the number of mixed color pixels is counted and addition is performed on each degree of reduction using an optimum weight value, thereby making it possible to determine a degree of reduction which is suitable for the entire printed output.

Besides, according to claims 11 to 13 of the present invention, a method of adjusting print data can be provided for enhancing color reproducibility in mixed-color printing similarly.

In addition, according to claims 14 to 16 of the present invention, it is possible to provide a software storage medium containing a print data adjusting program capable of enhancing color reproducibility in mixed-color printing.

BRIEF DESCRIPTION OF THE DRAWINGS

Figure 11:
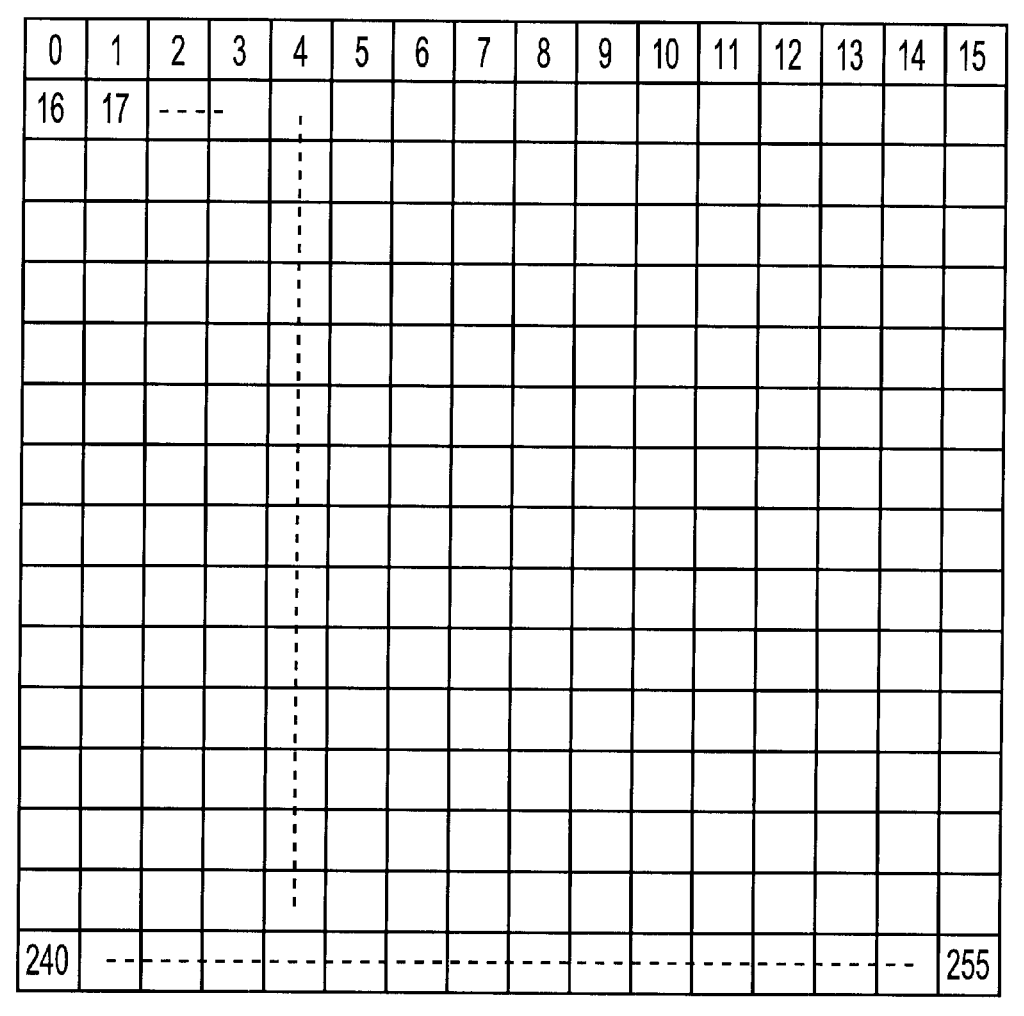

FIG. 11 is a diagram showing a patch pattern to be printed;

FIG. 13 is a diagram showing a correction lookup table containing different coefficient values;

BEST MODE FOR CARRYING OUT THE INVENTION

With reference to the accompanying drawings, the following describes a first preferred embodiment of the present invention.

Figure 1:
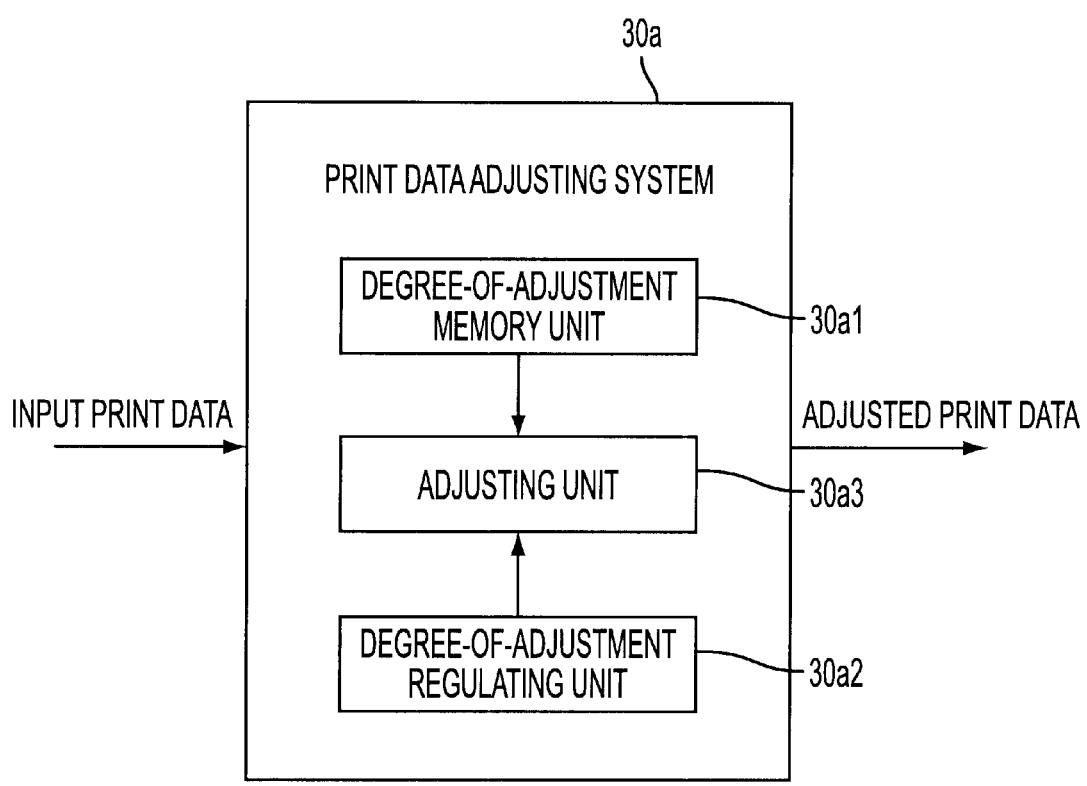
FIG. 1 is a general application diagram showing a print data adjusting system in a preferred embodiment of the present invention.
Figure 2:
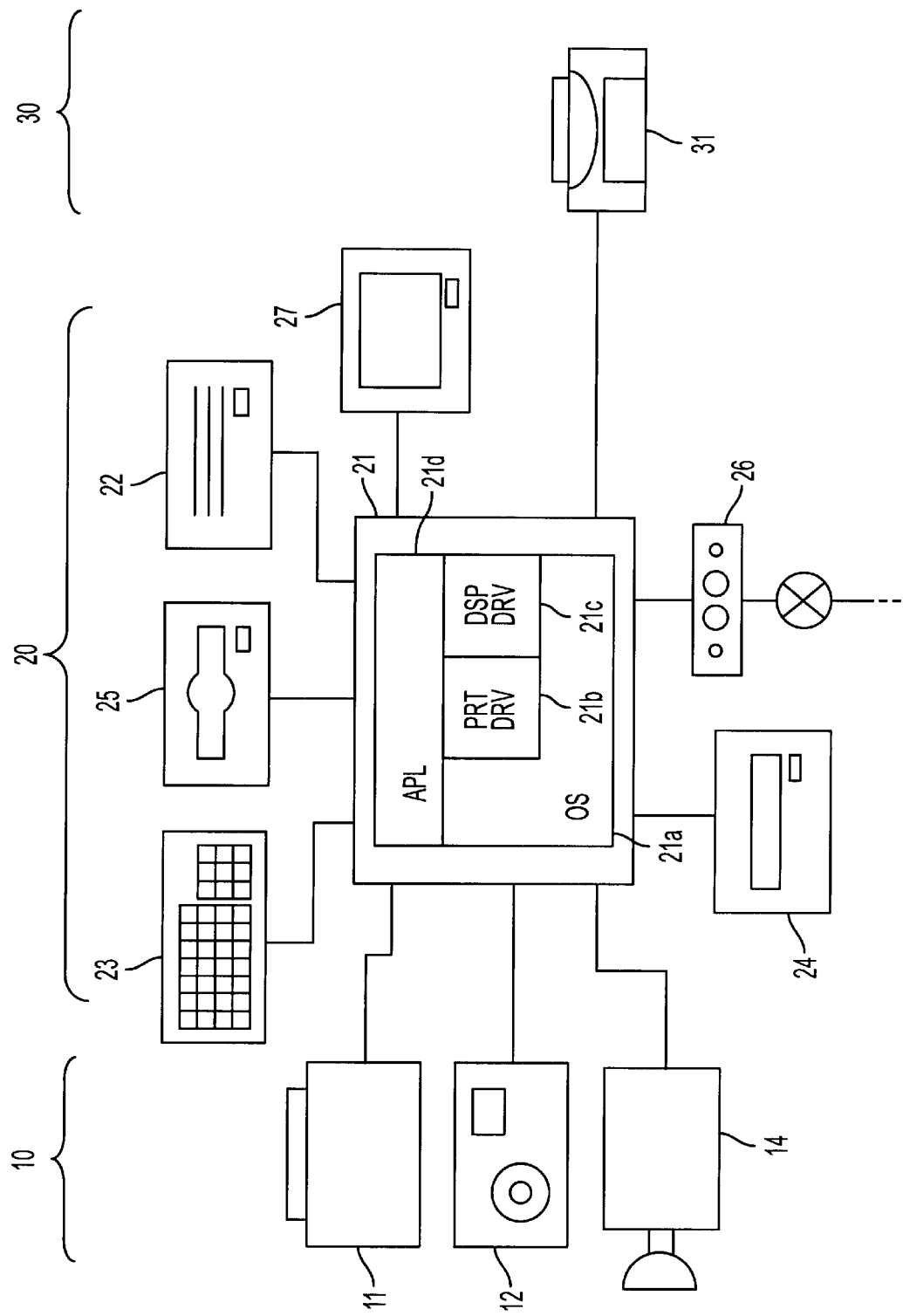
FIG. 2 is a block diagram showing a concrete example of printing system hardware configuration in application of the print data adjusting system according to the present invention.

FIG. 1 shows a general application diagram of a print data adjusting system in the first preferred embodiment of the present invention, and FIG. 2 shows a block diagram illustrating a hardware configuration of a printing system in application of the print data adjusting system according to the present invention.

The printing system in implementation of the present invention is generally divided into image input apparatus 10, image processing apparatus 20, and printing apparatus 30. A concrete example of the image input apparatus 10 is a scanner 11, a digital still camera 12 or a video camcorder 14, a concrete example of the image processing apparatus 20 is a computer system comprising a computer 21, a hard disk unit 22, a keyboard 23, a CD-ROM drive unit 24, a floppy disk drive unit 25, a modem 26, a display monitor 27, etc., and a concrete example of the printing apparatus 30 is a printer 31 or the like. The modem 26 can be connected to a public communication line for downloading software and data from an external network through the public communication line.

In the above printing system arrangement, the scanner 11 or digital still camera 12 serving as the image input apparatus 10 provides RGB (red, green, blue) 256-level gradation image data, and the printer 31 serving as the printing apparatus 30 needs input of CMYK (cyan, magenta, yellow, black) two-level gradation image data. Therefore, in the computer 21 serving as the image processing apparatus 20, RGB 256-level gradation image data is input, predetermined image processing and print processing are carried out, and then CMYK two-level gradation image data is output. An operating system 21a is run in the computer 21, and a printer driver 21b for the printer 31 and a display driver 21c for the display monitor 27 are incorporated therein. Under direction of the operating system 21, application software 21d is controlled for execution of processing thereof, and the application software 21d performs display processing for the display monitor 27 in conjunction with the display driver 21c and it carries out print processing in conjunction with the printer driver 21b as required.

In the present preferred embodiment, a print data adjusting system 30a receives input print data generated through a print data generating process carried out in such a printing system arrangement as mentioned above, and performs predetermined print, data adjustment to deliver output of adjusted print data. In this case, degree-of-adjustment memory unit 30a1 retains a degree of adjustment per element color for correcting an instrumental error as described later, degree-of-adjustment regulating unit 30a2 judges a mixed-color order to provide an instruction for decreasing the degree of adjustment for each dot, and according to the degree-of-adjustment decreasing instruction given by the degree-of-adjustment regulating unit 30a2, first adjustment unit 30a3 decreases the degree of adjustment per element color stored in the degree-of-adjustment memory unit 30a1 to substantially carry out data adjustment. This processing sequence is explained in detail below.

Figure 3:
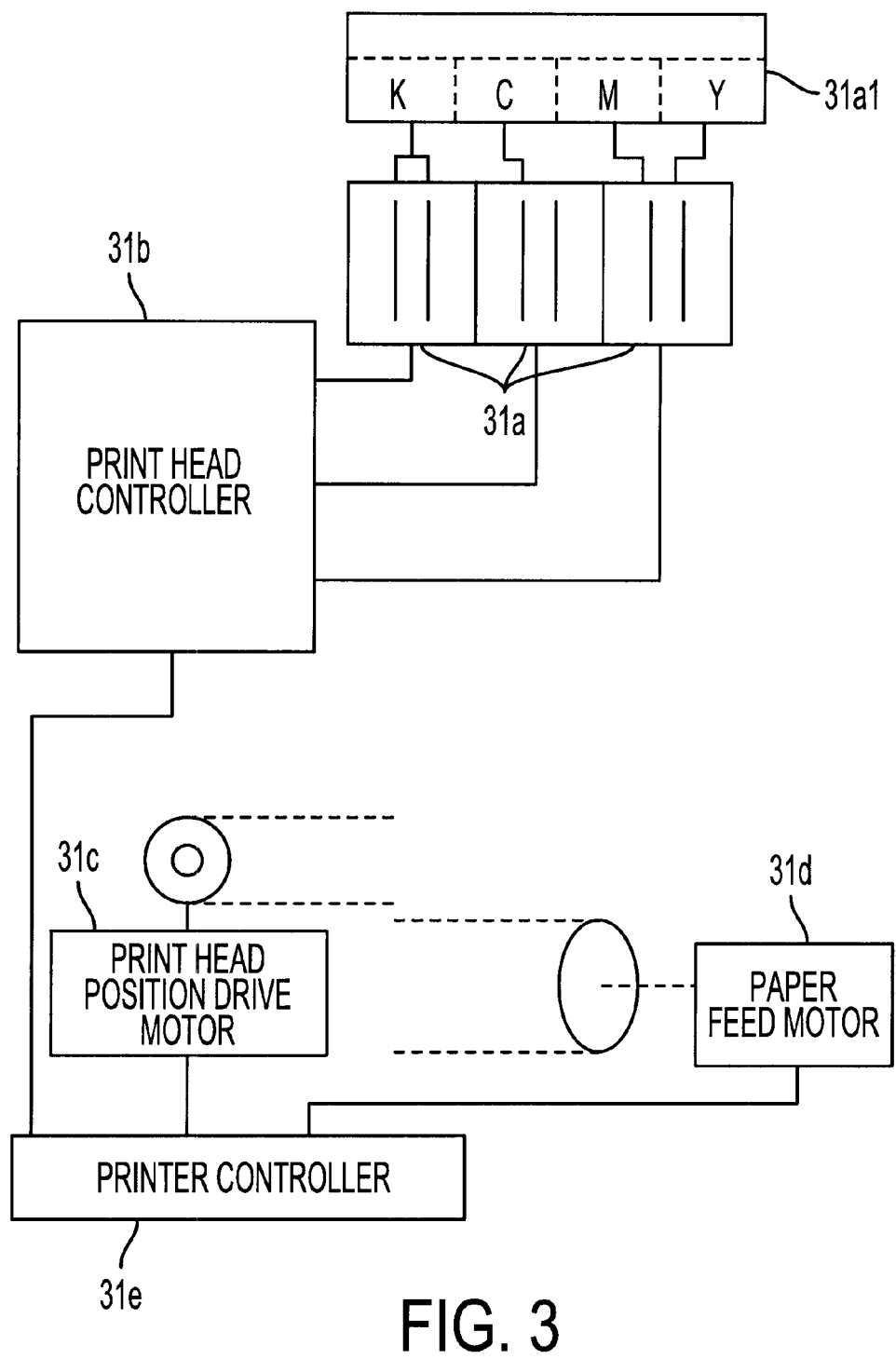
FIG. 3 is a schematic block diagram showing a printer.

The printer 31 on which a printing operation is performed according to the adjusted print data is described first. Referring to FIG. 3, there is shown a schematic configuration of the printer 31, which is provided with a dot printing mechanism comprising a print head 31a including three print head units, a print head controller 31b for controlling the print head 31a, a print head position drive motor 31c for moving the print head 31a in the horizontal direction, a paper feed motor 31d for feeding printing paper in the vertical direction, and a printer controller 31e serving as an interface with an external device for the print head controller 31b, print head position drive motor 31c and paper feed motor 31d. With this dot print mechanism, the printer 31 is capable of print images in accordance with print data.

Figure 4:
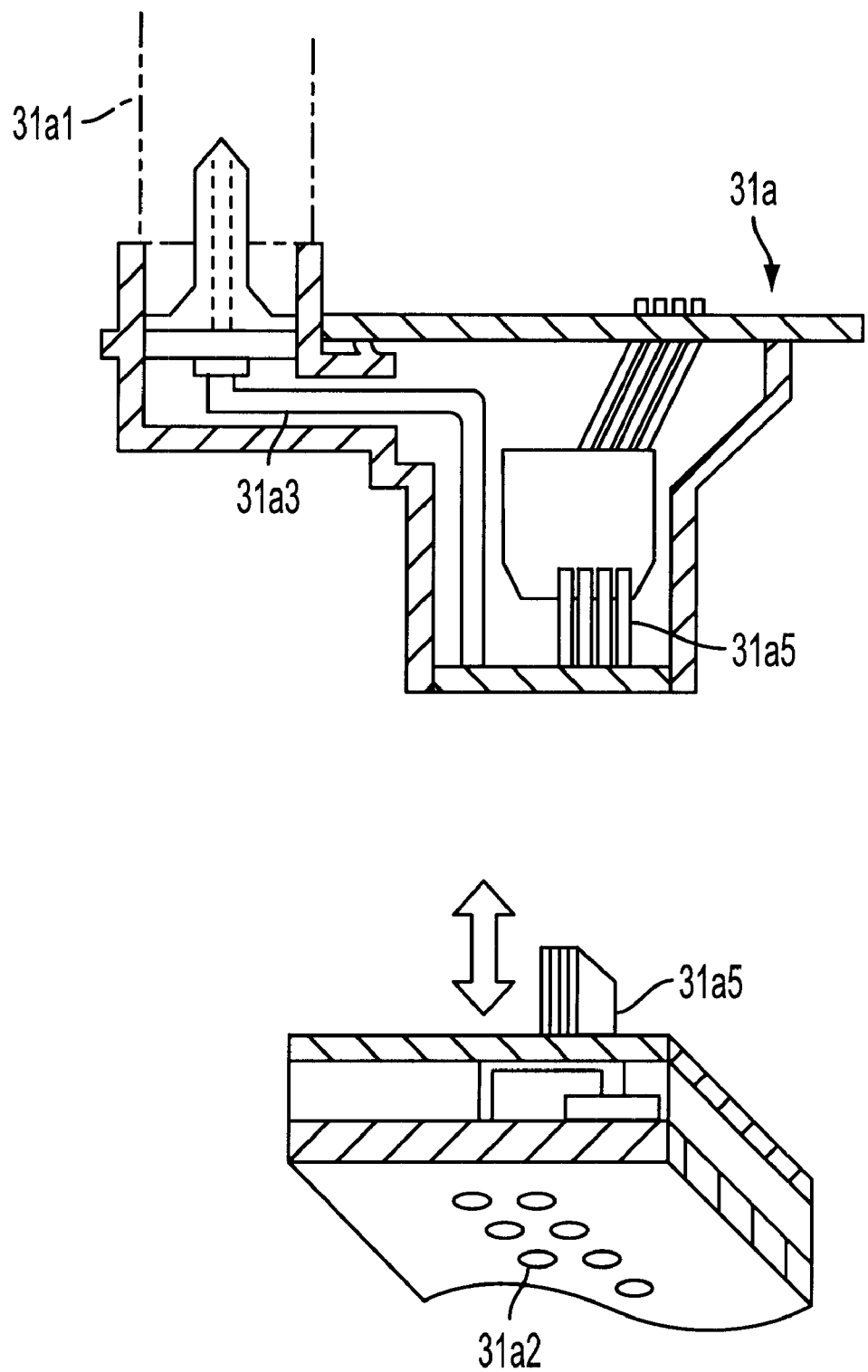
FIG. 4 is a diagrammatic illustration showing a print head unit mounted on the printer.
Figure 5:
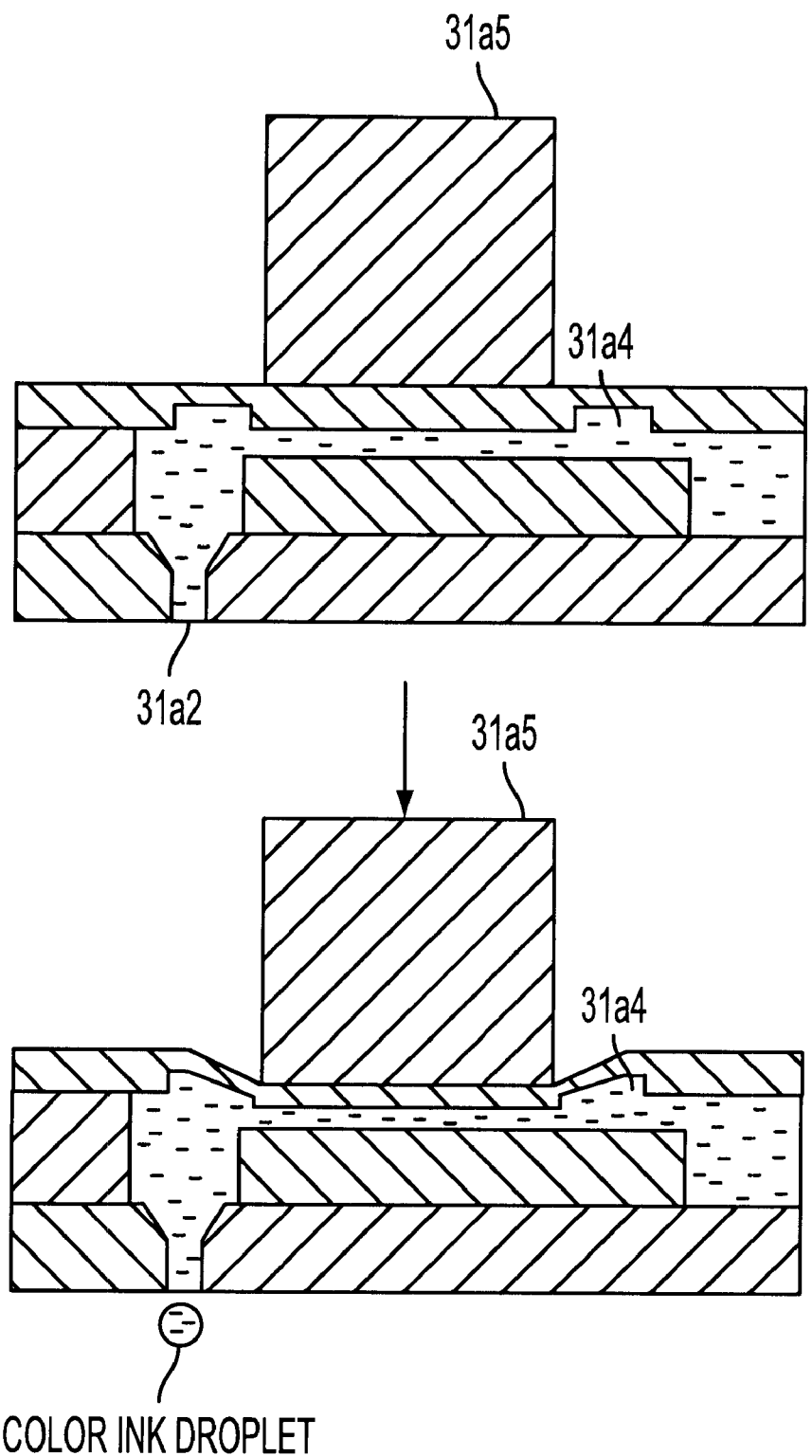
FIG. 5 is a diagrammatic illustration showing color ink ejection from the print head unit.
Figure 6A:
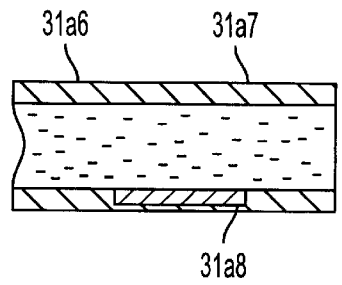
FIGS. 6(a)–(e) is a diagrammatic illustration showing color ink ejection from a bubble-jet type of print head.
Figure 6B:
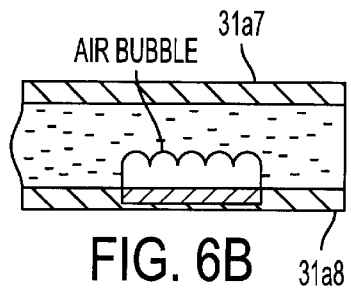
Figure 6C:
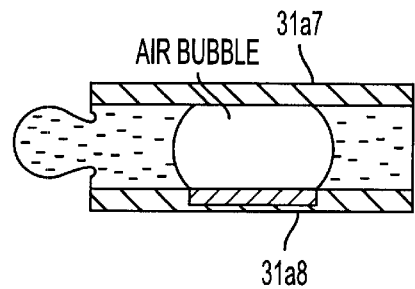
Figure 6D:
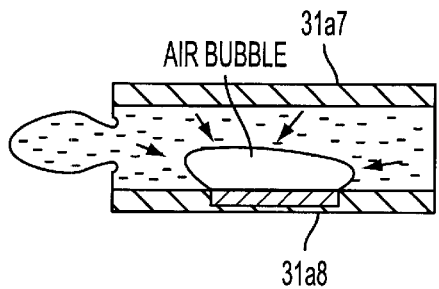
Figure 6E:
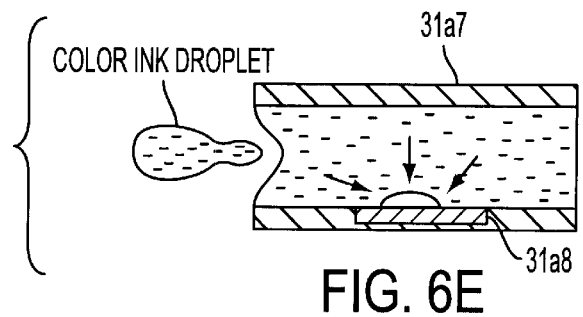

FIG. 4 shows a concrete illustration of a structure of the print head 31a, and FIG. 5 illustrates an operation of ink droplet ejection. In the print head 31a, a fine conduit 31a3 is formed between a color ink reservoir 31a1 and a nozzle 31a2, and an ink channel 31a4 is formed at the end of the conduit 31a3. A wall of the ink channel 31a4 is made of flexible material, and a piezoelectric element 31a5 for electrostriction is disposed thereon. When a voltage is applied to the piezoelectric element 31a5, its crystal structure is deformed to cause electric-mechanical energy conversion at high speed. Deformation of the crystal structure presses the wall of the ink channel 31a4 to decrease its volume. Thus, a color ink droplet having a predetermined quantity is jetted out through the nozzle 31a2 communicating with the ink channel 31a4. The structure mentioned above is hereinafter referred to as a micro-pump mechanism.

Each print head unit comprises nozzles 31a2 formed in two independent rows, and color ink is supplied to each row of nozzles 31a2 independently. That is, each of three print head units has two rows of nozzles, and in maximum use of these rows of nozzles, it is possible to provide up to six colors of ink. In the example shown in FIG. 3, two rows of nozzles in the left print head unit are used for black ink, one of two rows of nozzles in the center print head unit is used for cyan ink, and two rows of nozzles in the right print head unit are used for magenta ink and yellow ink, respectively.

As mentioned above, the printer 31 of an ink-jet design having the micro-pump mechanism is used in application of the present preferred embodiment. In the ink-jet printer 31 arranged for dot deposition, a droplet of ink is ejected through the print head 31a to print each dot. However, the size of a dot to be printed is not consistent among printers, i.e., there is an instrumental error in the print head 31a among them. In a situation where printing density is not changed by overprinting, the size of each dot has an effect on printing density. Therefore, if there is an instrumental error in terms of dot size, variation occurs in printing density. In multi-color printing, an instrumental error causes variation in color balance and lightness, and in monochrome printing, it causes variation in shades of gray.

While the ink-jet printer 31 having the micro-pump mechanism is used in application of the present preferred embodiment, it is to be understood that the invention is applicable to any dot-deposition type of printer which may contain an instrumental error in dot size.

For example, as shown in FIG. 6, there is a commercially manufactured bubble-jet pump mechanism in which a heater 31a8 is provided on an inside wall of a conduit 31a7 in the vicinity of a nozzle 31a6 and an air bubble is produced through-heating by the heater 31a8 to eject a color ink droplet using its pressure. In this case, it cannot be denied that an instrumental error may occur due to variability in performance of the heater 31a8, bore configuration of the nozzle 31a6, etc.

Figure 7:
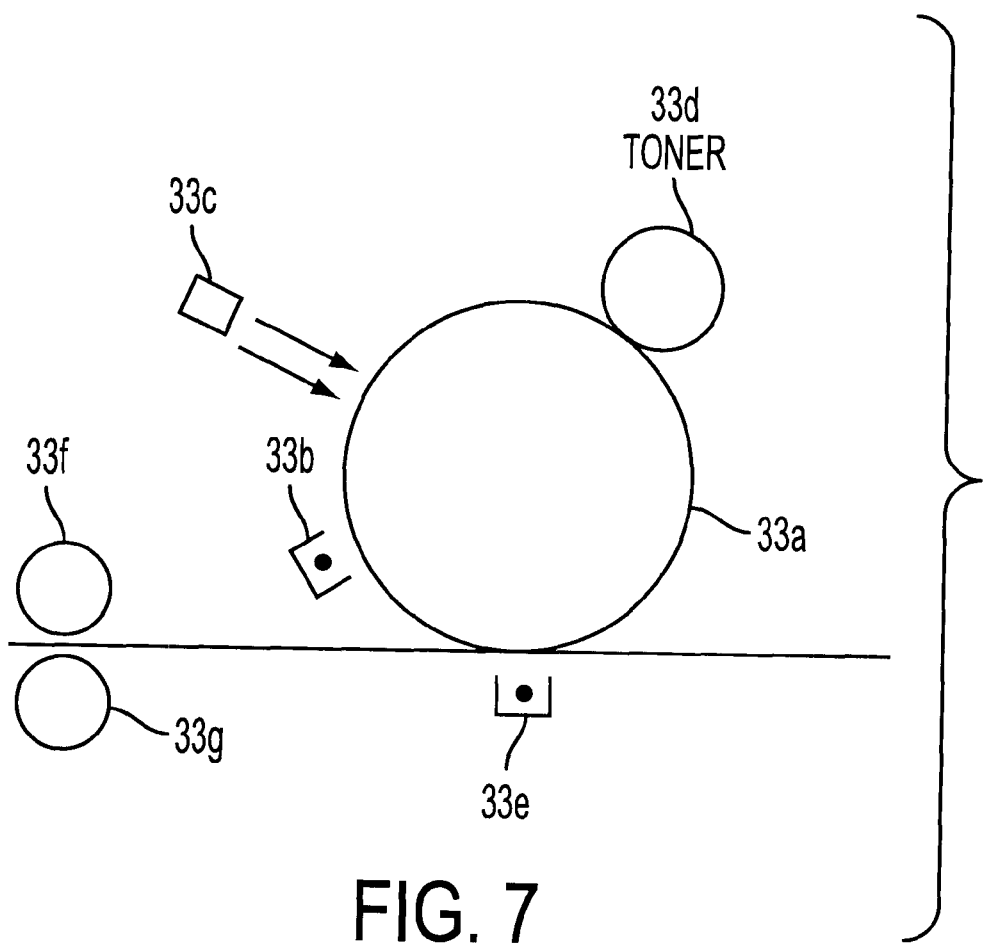
FIG. 7 is a diagrammatic illustration showing an electrophotographic type of printer.

Referring to FIG. 7, there is shown a schematic structure of an electrophotographic type of printer 33. Disposed around the periphery of a photosensitive rotary drum 33a in its rotating direction are a charging device 33b, an exposing device 33c, a developing device 33d and a transferring device 33e. The circumferential surface of the rotary drum 33a is electrostatically charged evenly by the charging device 33b, electrostatic charges corresponding to an image part are removed by the exposing device 33c, toner is attached to a latent image on the rotary drum 33a by the developing device 33d, and then toner is transferred onto a recording medium or printing paper by the transferring device 33e. Thereafter, the printing paper is fed between a heater 33f and a roller 33g to fix the image on it through fusing.

In the electrophotographic printer 33 mentioned above, variation may also occur in the quantity of attached toner due to an instrumental error in the charging device 33b, exposing device 33c or rotary drum 33a, giving rise to a problem similar to that in the ink-jet printer 31.

Figure 8:
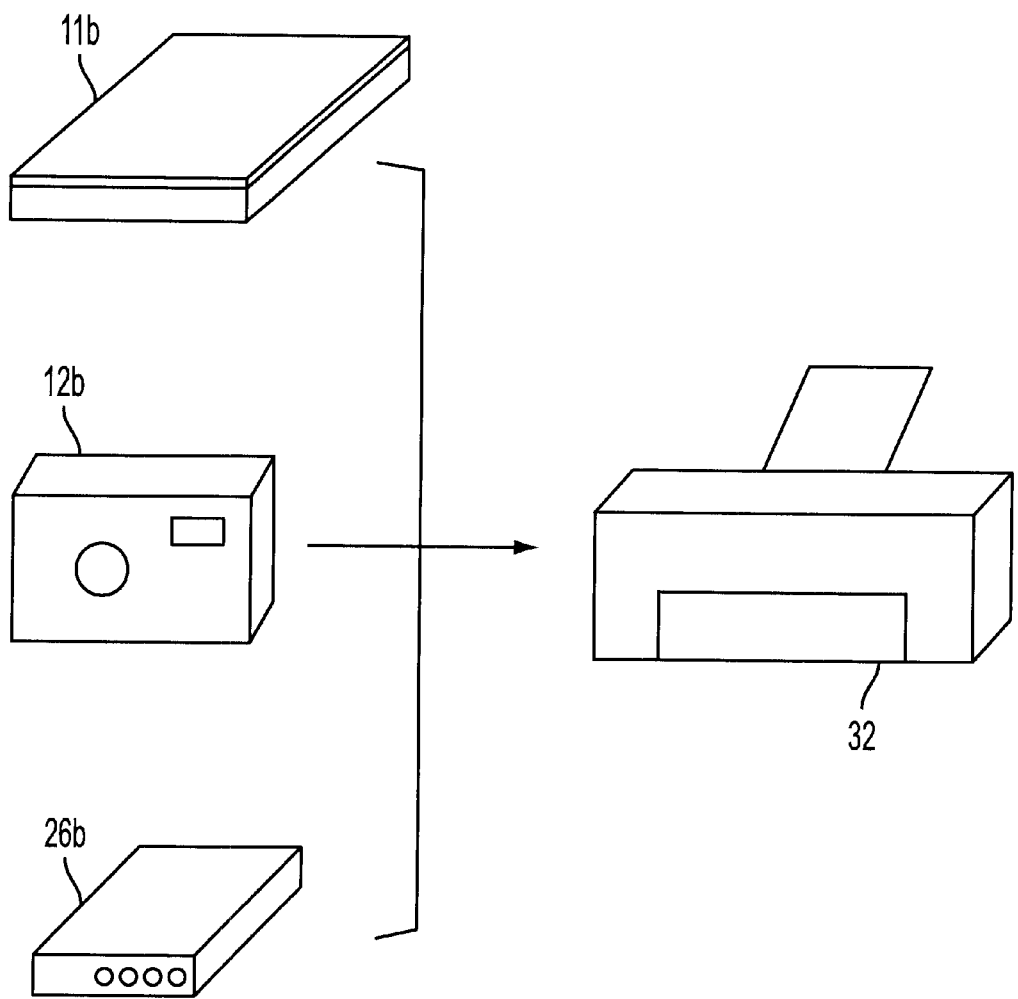
FIG. 8 is a schematic block diagram showing another example of application of the print data adjusting system according to the present invention.

In the present preferred embodiment, the computer system is arranged between the image input apparatus 10 and the printing apparatus 30 for carrying out print processing as aforementioned. The computer system is not always required, however. For example, as shown in FIG. 8, in case of a printer 32 capable of receiving image data input without using a computer system, there may be provided such an arrangement that image data is input directly from a scanner 11b, a digital still camera 12b or a modem 26b for printing, in which image data adjustment is carried out by eliminating an instrumental error.

Figure 9:
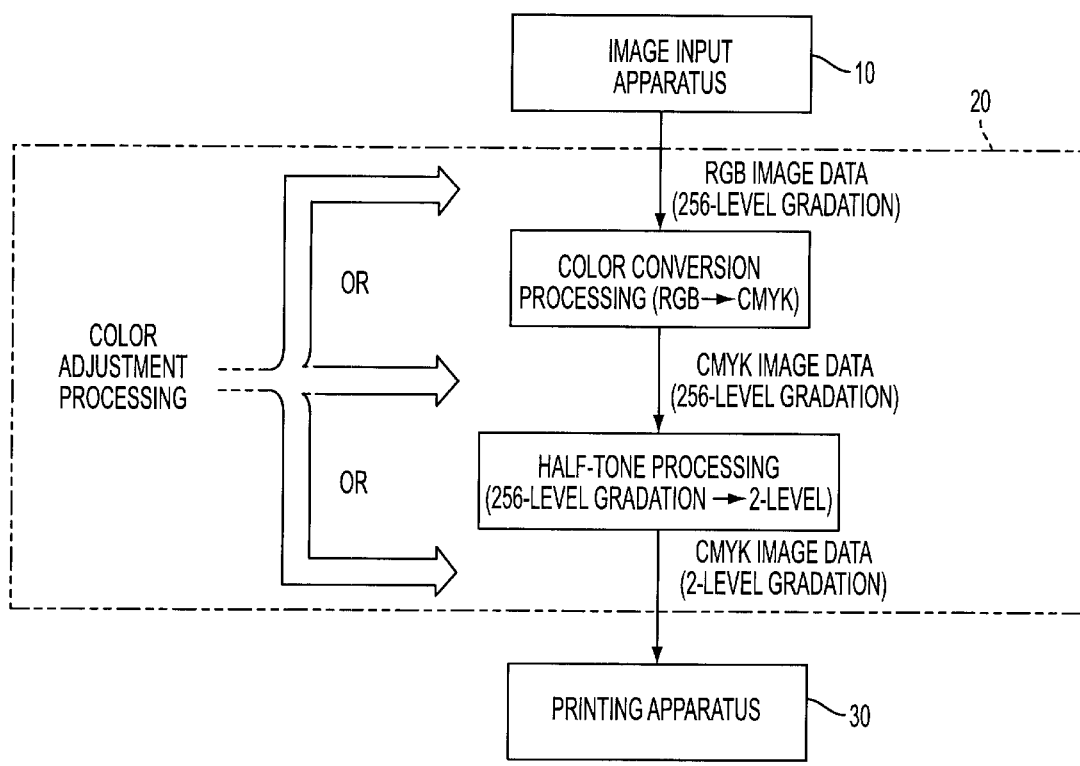
FIG. 9 is a block diagram showing a concrete printing procedure.

The following describes a process through which print data is delivered to the printer 31. Referring to FIG. 9, there is indicated a flow of image data. The image input apparatus 10 outputs RGB multi-level-gradation (256-level gradation) image data containing dot-matrix pixels to the image processing apparatus 20, and then the image processing apparatus 20 carries out predetermined image processing and delivers CMYK two-level gradation image data (binary data) to the printing apparatus 30. In the image processing apparatus 20, RGB-to-CMYK color space conversion is performed to convert RGB 256-level gradation image data into CMYK 256-level gradation image data. Then, since the printing apparatus 30 can accept two-level gradation image data, half-tone processing is performed to convert CMYK 256-level gradation image data into two-level gradation image data. Through the above-mentioned process, image data is output as print data to the printing apparatus 30. The image data may be referred to as print data in a broad sense since the same image data is treated in this process and its preceding steps. In principle, the print data adjusting apparatus 30a mentioned above is capable of adjusting print data at any preceding step. In the present preferred embodiment, the print data adjusting apparatus 30a carries out adjustment on CMYK 256-level gradation image data simultaneously with color conversion.

Figure 10:
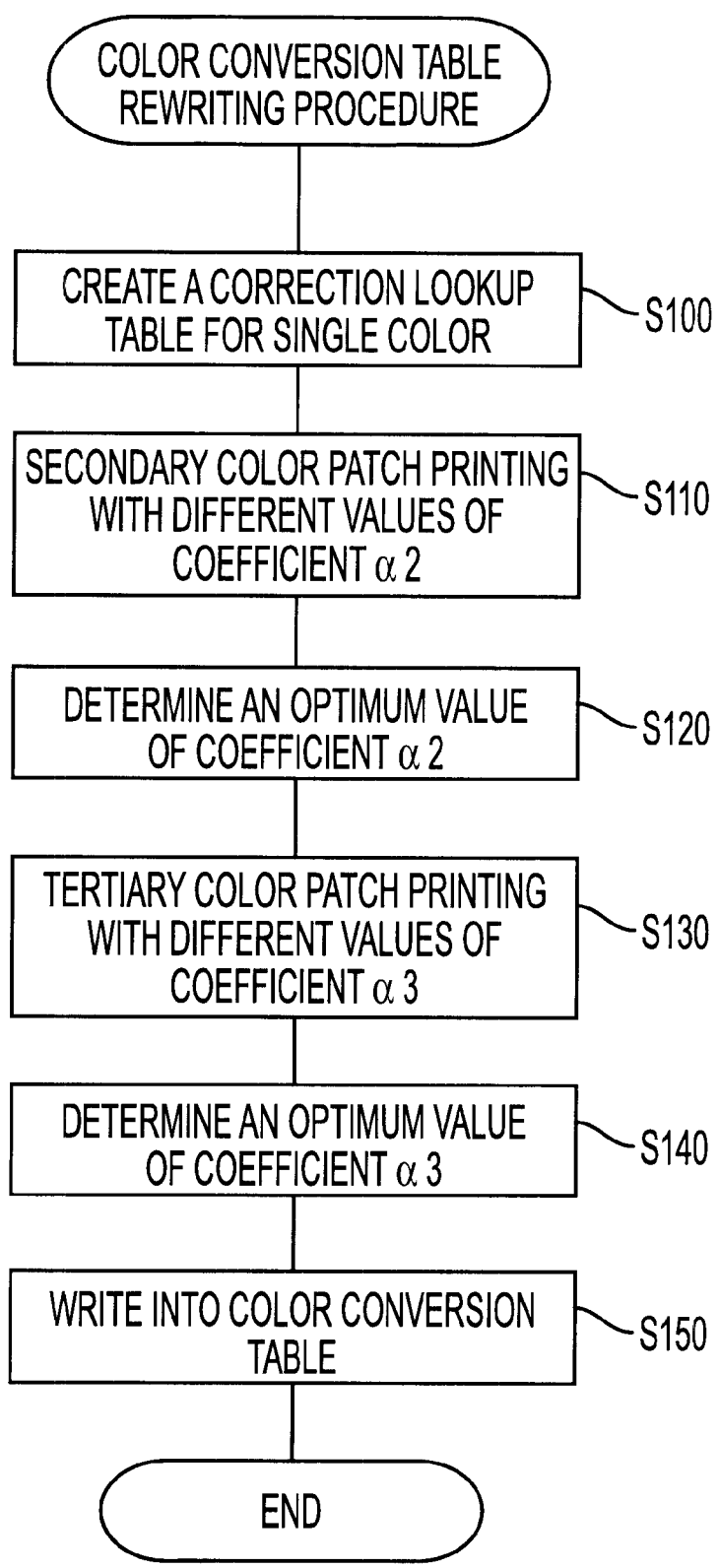
FIG. 10 is a flowchart showing a color conversion table rewriting procedure.

Referring to FIG. 10, there is shown a color conversion table rewriting procedure which is performed as color conversion processing in print data adjustment. Described below are steps of the color conversion table rewriting procedure.

First, at step S100, a correction lookup table for primary color (single color) is prepared. This correction lookup table is created in the following manner. As mentioned in the foregoing description, a patch pattern is printed in the entire gradation range with a reference print head 31a which ejects color ink droplets in reference volume. In the present preferred embodiment, since there are 256 levels of gradation, a printed patch pattern has an array form consisting of 16 horizontal elements and 16 vertical elements. With each print head 31a having an instrumental error, a patch pattern is printed in the entire gradation range in the same manner. Since the print head 31a having an instrumental error ejects color ink droplets in inconsistent volume, the density of the patch pattern printed therewith does not meet that printed with the reference print head 31a in terms of the entire gradation range.

Figure 12:
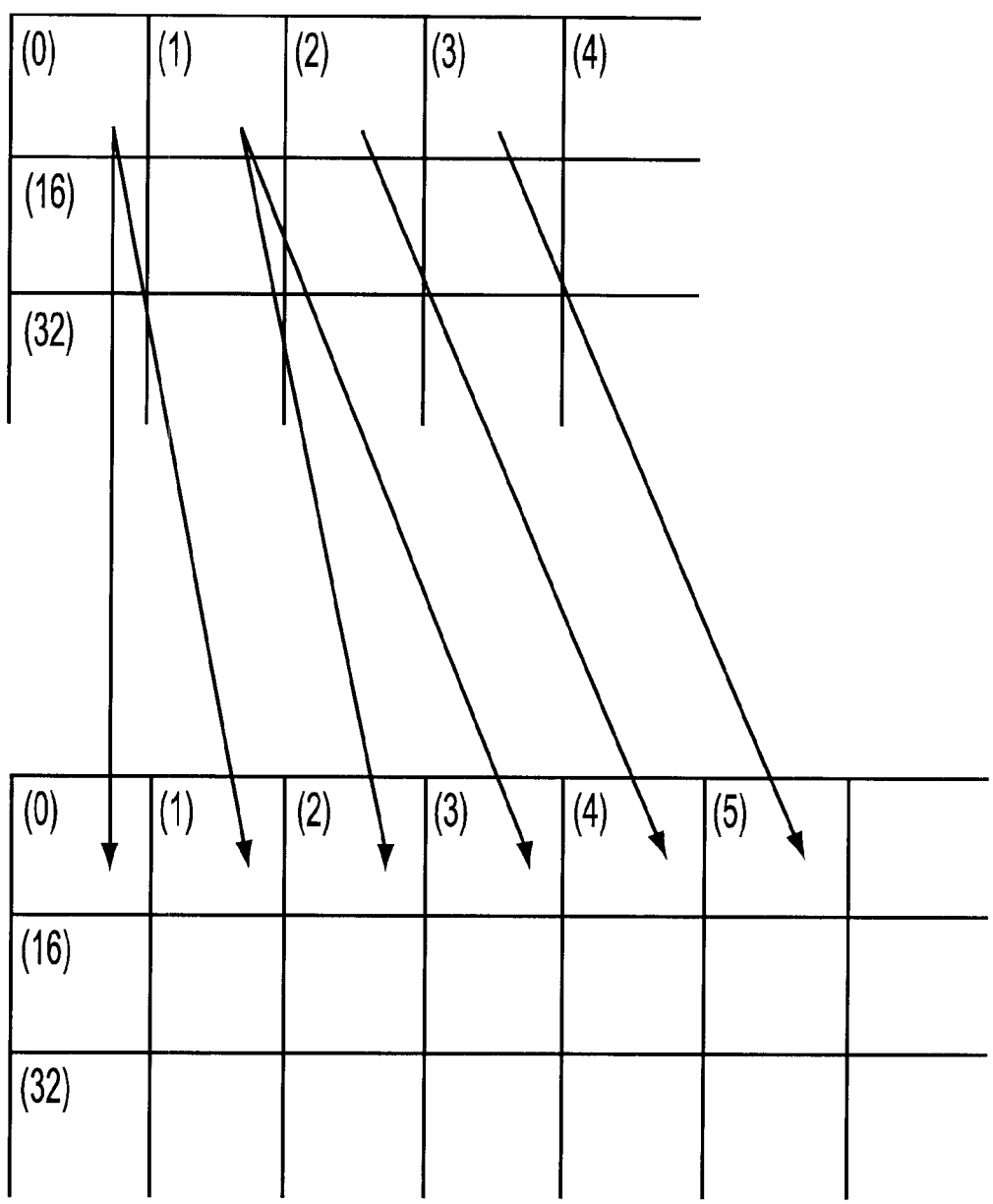
FIG. 12 is a diagram showing comparison between patch patterns produced with a reference print head and a print head containing an instrumental error.

Therefore, as shown in FIG. 12, comparison is made between each patch element printed with the print head 31a having an instrumental error and that printed with the reference print head 31a, i.e., gradation levels of corresponding patch elements are compared. In this figure, there are shown patch elements printed for predetermined gradation data input using the print head 31a having an instrumental error and the reference print head 31a. Combinations of patch elements having the same printing density are indicated. More specifically, the following combinations are found.

With respect to printing density, patch elements printed for input of gradation data "0" and input of gradation data "1" using the print head having an instrumental error are coincident with a patch element printed for input of gradation data 10 using the reference print head.

Further, with respect to printing density, patch elements printed for input of gradation data "2" and input of gradation data "3" using the print head having an instrumental error are coincident with a patch element printed for input of gradation data "1" using the reference print head.

Still further, with respect to printing density, a patch element printed for input of gradation data "4" using the print head having an instrumental error is coincide with a patch element printed for input of gradation data "2" using the reference print head, and a patch element printed for input of gradation data "5" using the print head having an instrumental error is coincide with a patch element printed for input of gradation data "3" using the reference print head.

These combinations of patch elements having the same printing density are used to create a correction lookup table. In the present preferred embodiment, since three print heads 31a (three print head units) are provided, a correction lookup table is created for each of these print heads 31a. It can be said that the correction lookup table contains degree-of-adjustment data mentioned in the foregoing. Namely, the printing density for reference gradation data "3" corresponds to that for gradation data "5" in actual printing, and the degree of adjustment in this case is "+2". Data on such correspondence relationship in the entire gradation range is contained in the correction lookup table. In this sense, the correction lookup table is therefore regarded as a set of record data concerning a degree of adjustment for each element color.

If a correction lookup table created for each print head 31a in the above manner is adopted, it is considered that correction of other than primary color can be made similarly. In practical operation, however, inconsistency takes place when secondary color (mixed color made of two colors, e.g., C and M) or tertiary color (mixed color made of three colors, e.g., C, M and Y) is used.

Therefore, at step S110, a degree of adjustment in the correction lookup table is reduced for secondary color patch printing. In regulation of a degree of reduction, a degree of adjustment is multiplied by a predetermined coefficient. FIG. 13 shows a correction lookup table in which the coefficient has a decremental value of "0.1".

Explained below is the correction lookup table shown in FIG. 13. The column "α=1" in this table represents the contents of the original correction lookup table created as shown in FIG. 12. More specifically, in FIG. 13, "0 to 255" in the leftmost column indicate input gradation data values, and adjusted gradation data values corresponding to them are indicated in the column "α=1". For instance, input gradation data "0" corresponds to adjusted gradation data "0", input gradation data "2" corresponds to adjusted gradation data "1", input gradation data "180" corresponds to adjusted gradation data "160", and input gradation data "255" corresponds to adjusted gradation data "255".

As the coefficient "α" is decremented to "0.9", "0.8", "0.7" and so forth, each degree of reduction is decreased. Although there is no significant change in the low gradation region and high gradation region since a degree of adjustment is small, a difference becomes apparent in a gradation region where a degree of adjustment is large. For instance, at gradation "180", a difference in degree of adjustment of gradation data is "20" when the coefficient is "1.0", and as the coefficient is decreased in decrements of "0.1", the degree of adjustment of gradation data is reduced in decrements of "2". For secondary color, an individual correction lookup table is created for each print head 31a similarly, and the same coefficient is applied. In such a case, it is not necessarily required for the coefficient to have a decremental value "0.1".

At step S120, a secondary color patch pattern printed using the reference print head 31a is compared with that printed using each print head 31a having an instrumental error under condition of different values of coefficient α2. Through this comparison, an optimum value of coefficient α2 for minimizing inconsistency is determined. In the result of experiments conducted by the inventors, it has been revealed that the optimum value of coefficient α2 is "0.8".

Then, for tertiary color, an optimum value of coefficient α3 is determined in the same fashion. More specifically, at step S130, tertiary color patch printing is performed with different values of coefficient α3, and at step S140, an optimum value of coefficient α3 is determined through comparison with a patch pattern printed using the reference print head 31a. In the result of experiments conducted by the inventors, it has been found that the optimum value of coefficient α3 is approximately "0.6".

In the above cases of secondary color and tertiary color patch patterns printed by adding respective element colors equally, the optimum coefficient values can be determined as mentioned. However, in practical print data, element colors for respective pixels are mixed in a variety of manners. It is not always defined that coefficients α2 and α3 are optimum for secondary color and tertiary color respectively.

Figure 14:
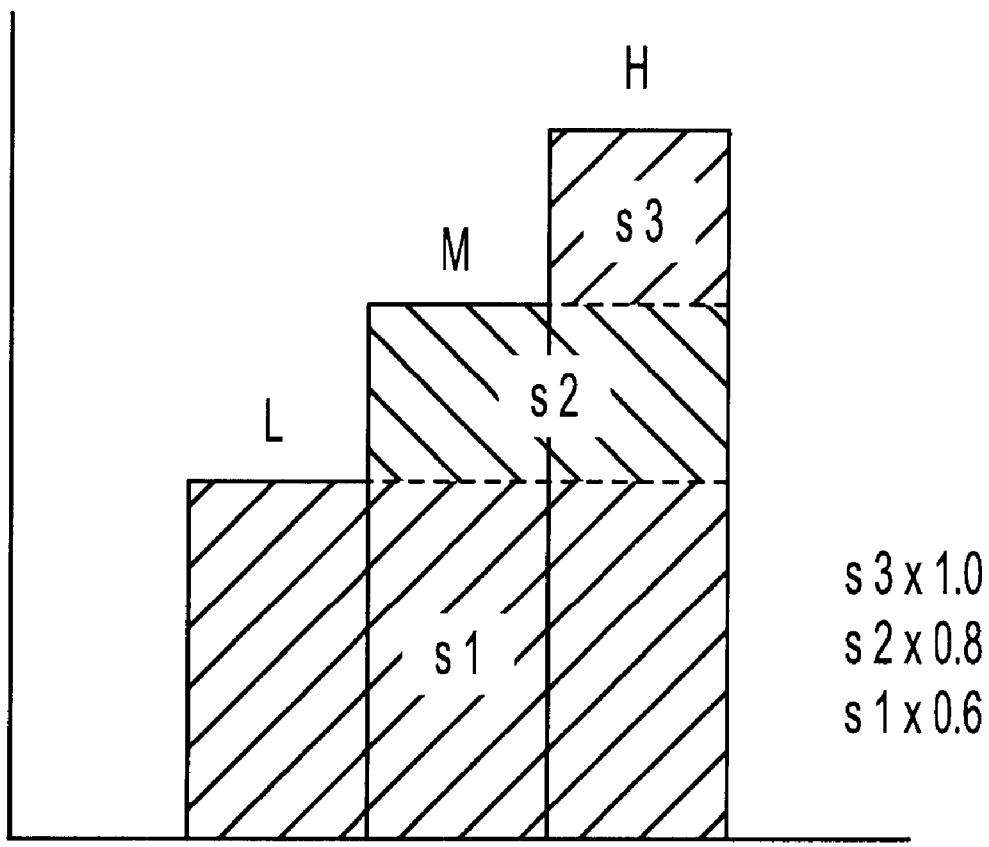
FIG. 14 is a diagram showing addition which is performed using weighted coefficients corresponding to mixed-color orders in accordance with pixel composition.

Referring to FIG. 14, there is shown a diagram in which a compositional value of element color corresponding to each pixel composition is indicated. Representing the highest compositional value as H, the lowest compositional value as L and the intermediate compositional value as M, this diagram signifies the following conditions: All the element colors are satisfied in a compositional value L region, two element colors are satisfied in a compositional value L-M region, and one element color is satisfied in a compositional value H region. It can therefore be considered that sum component s1 in the compositional value L region where all the element colors are satisfied belongs to tertiary color, sum component s2 in the compositional value L-M region where two color elements are satisfied belongs to secondary color, and sum component s3 in the compositional value H region where one color element is satisfied belongs to primary color. The sum components s1, s2 and s3 with respect to entire component sum S are multiplied by coefficients α3, α2 and 1.0 respectively to determine a value of coefficient α10 as expressed below:

$$\alpha 10 = \alpha 3 \times (s1/S) + \alpha 2 \times (s2/S) + 1.0 \times (s3/S) \qquad (1)$$

A value of coefficient α10 thus attained is used.

In this case, the degree-of-adjustment memory unit 30a1 is implemented in hardware/software for storing a correction lookup table concerning at least primary color, and the degree-of-adjustment regulating unit 30a2 is implemented in hardware/software for calculating a value of coefficient α10 according to equation (1).

As a matter of course, equation (1) used by the degree-of-adjustment regulating unit 30a2 is exemplary. Coefficient α10 may be such that a degree of adjustment is reduced as a mixed-color order is increased to secondary and tertiary color levels using a correction lookup table concerning at least primary color.

For instance, it is also possible to use a parameter indicating a degree of approximation of a particular color to its corresponding tertiary color. In RGB color scheme, for example, there is provided a parameter of gray-scale level which has value "100" when it is approximately equal to gray and value "0" when it is approximately equal to primary color. Coefficient α3 is used if the gray-scale level is "100", and coefficient "1.0" is used if the gray-scale level is "0". A value of gray-scale level can be determined as mentioned below. Assuming that input data values for respective ink colors (compositional quantities) are "in_dataC1", "in_dataC2" and "in_dataC3", a minimum value of input data "MIN_value" is expressed as:

MIN_value=min (in_dataC1, in_dataC2, in_dataC3)

A maximum value of input data "MAX_value" is expressed as:

MAX_value max (in_dataC1, in_dataC2, in_dataC3)

An intermediate value of input data "MID_value" is expressed as:

MID_value=mid (in_dataC1, in_dataC2, in_dataC3)

In this case, gray-scale level "gray" is represented as shown below:

gray=(MIN_value×3)/(MIN_value+MAX_value+MID_value)

Needless to say, it is possible to use "MIN_value" as the numerator and an average value as the denominator. Further, a value of coefficient αg corresponding to gray-scale level "gray" can be calculated using the following equation:

$$\alpha g = 1 - 0.4 \times (gray/100) \quad (2)$$

Figure 15:
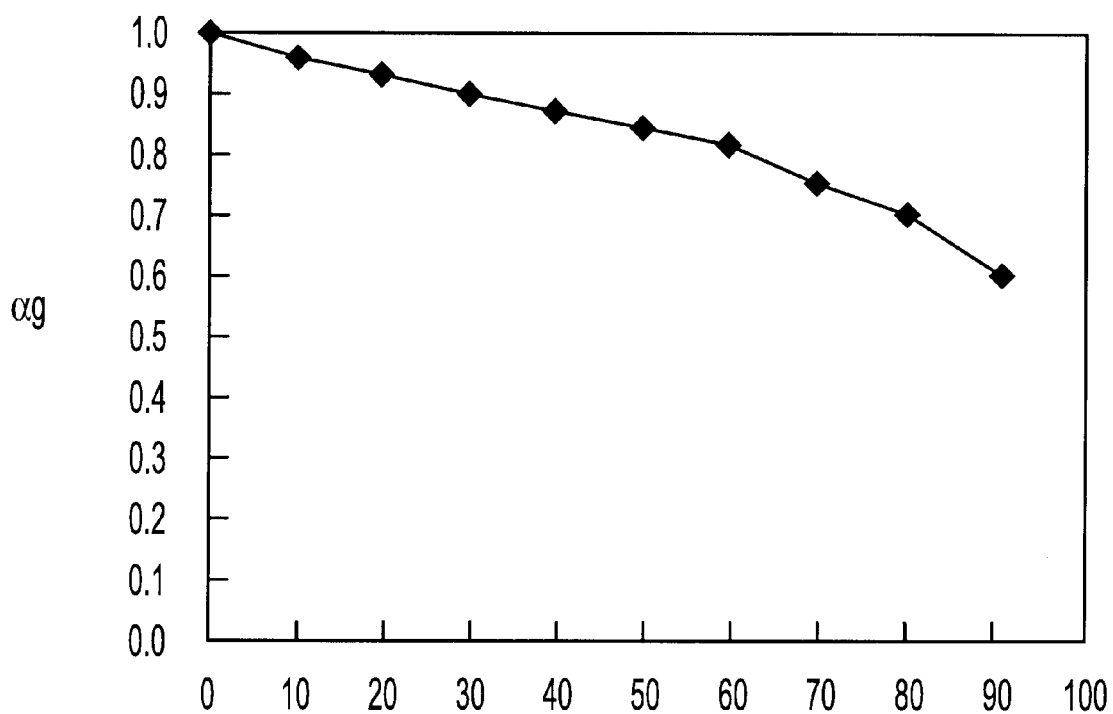
FIG. 15 is a graph showing an example of relationship between gray-scale level and coefficient values.

In the present preferred embodiment, gray-scale level "gray" is related with coefficient αg according to equation (2), and fine adjustment of relationship between these parameters is also possible. Referring to FIG. 15, there is shown an exemplary graph of relationship between gray-scale level and coefficient αg. In a region where gray-scale level "gray" is relatively high, a rate of change of coefficient αg is increased to some extent.

Figure 16A:
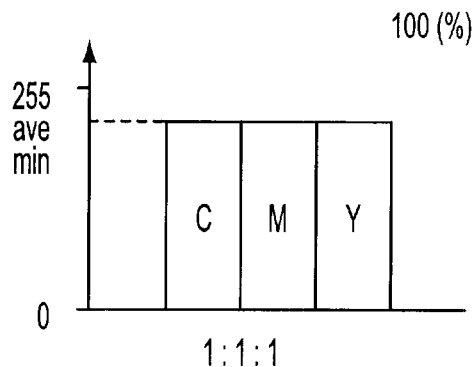
FIGS. 16(a)–(c) is a diagram showing concrete examples of gray-scale levels.
Figure 16B:
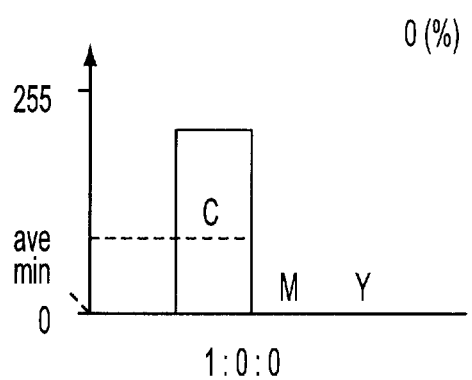
Figure 16C:
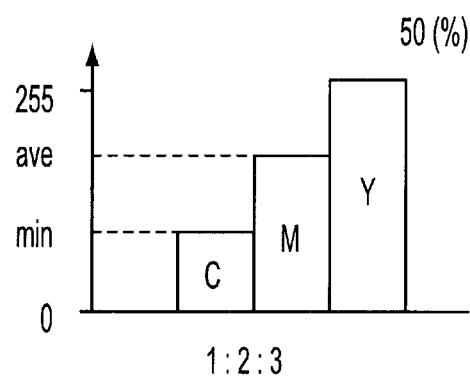

Referring to FIG. 16(a), there is shown a case where gray-scale level is "100", i.e., input data values for respective ink colors are equal. FIG. 16(b) shows a case where gray-scale level is "0", i.e., only one element color has a compositional quantity for primary color, and FIG. 16(c) shows a case where gray-sale level is "50". When input data values for respective ink colors are represented in a ratio of 1:2:3, gray-scale level is "50". In this case, a value of coefficient αg is "0.8" according to equation (2), whereas a value of coefficient α10 is "0.7333" according to equation (1). Since values of coefficient αg and α10 are different, a proper one of them is to be selected with reference to output results.

Figure 17:
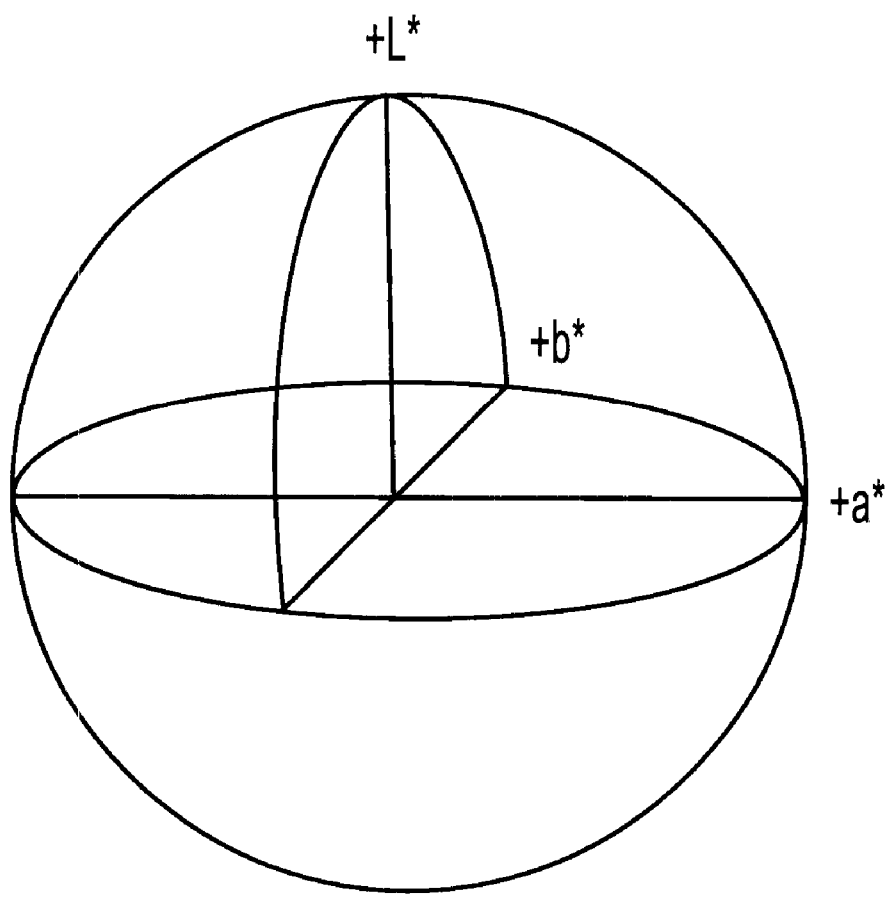
FIG. 17 is a diagram showing a color specification space of L*, a* and b*, in use of saturation.

On the other hand, the concept of gray-scale level mentioned above is commonly applicable to saturation which is one of characteristics in color representation. Referring to FIG. 17, there is shown a scheme of L*a*b* color specification space. In the three-dimensional space, lightness L* is indicated in the vertical direction and color is indicated on a horizontal coordinate plane. Horizontal plane coordinates are represented by orthogonal coordinates of axes a* and b*. Grayness increases toward the origin, and vividness increases toward the periphery. Namely, a distance from the origin corresponds to a degree of saturation, and it is inversely proportional to a gray-scale level. In a situation where print data contains such an indirect or direct saturation factor, it is also possible to determine a value of coefficient αs using saturation and reduce a degree of adjustment when reference is made to a correction lookup table for each element color.

In implementation of the above-mentioned adjustment technique, the first adjustment unit 30a3 may perform adjustment of CMYK print data using a value of coefficient according to equation (1) or (2) in combination with a correction lookup table. However, since a color conversion table is also referenced for RGB-to-CMYK color conversion, it is advantageous to rewrite the color conversion table so that color adjustment can be accomplished through single table reference. For this purpose, at step S150, the contents of a correction lookup table retaining determined coefficient values are written into the color conversion table.

Figure 18:
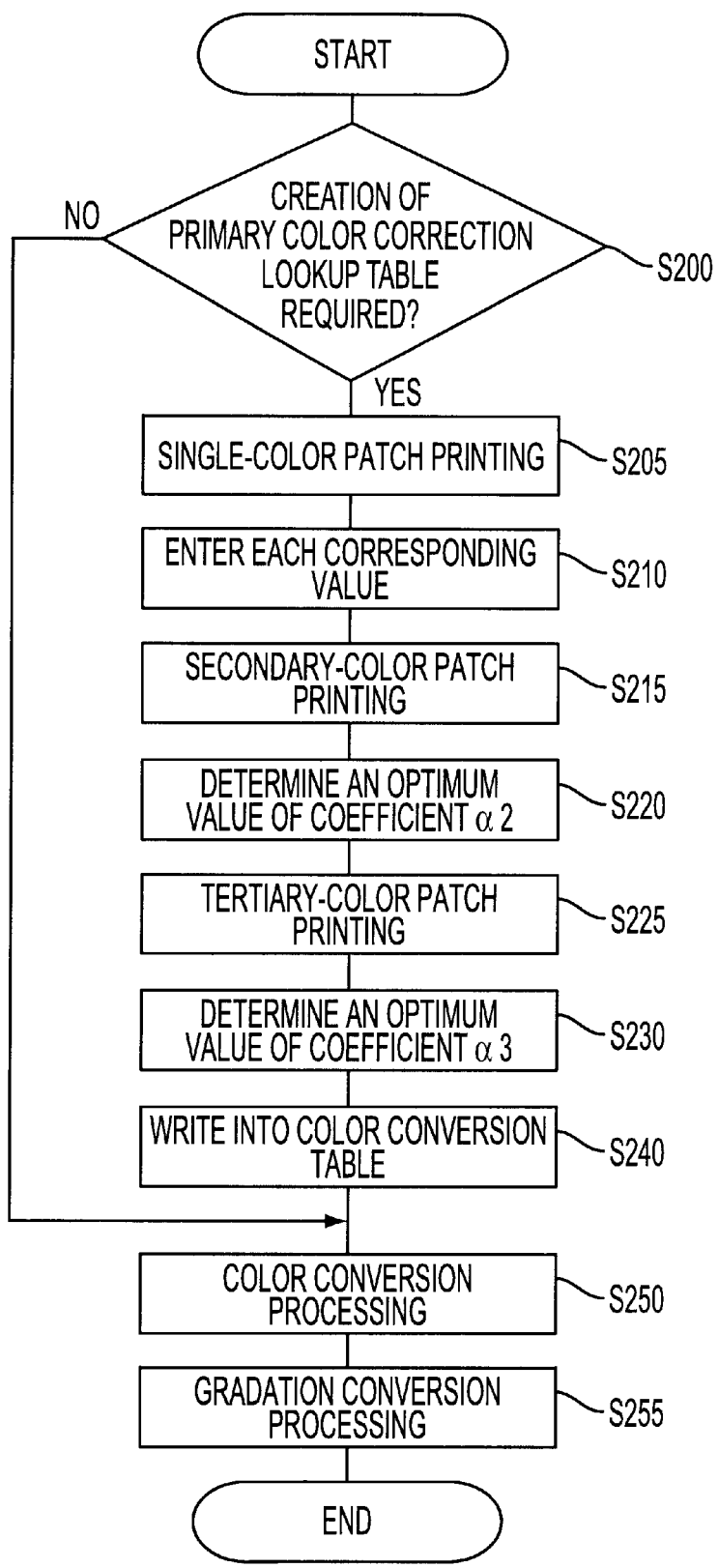
FIG. 18 is a flowchart showing operations of a first printer driver.

The procedure mentioned above is carried out when the printer driver 21b is run on the computer 21. With particular reference to FIG. 18, the following, describes the operational flow of the printer driver 21b in the present preferred embodiment.

In a situation where image data is read in through the scanner 11 and printed out through the printer 31, operations are performed as follows: Under condition that the operating system 21 is active on the computer 21, application software 21d is launched to let the scanner 11 start reading in image data. When the image data thus read in through the scanner 11 is taken into the application software 21d under control of the operating system 21a, predetermined image processing is carried out and then print processing is selected.

Upon selection of the print processing, the operating system 21a starts the printer driver 21b. Since a primary color correction lookup table is not available when the printer driver 21b is started initially, single-color patch printing is performed at step S205 following a judgment at step S200. On the other hand, a patch pattern printed using the reference print head 31a is prepared separately, and it is compared with a patch pattern printed using the print head 31a equipped on each printer 31. At step S210, each corresponding value is entered.

According to the result of comparison, secondary-color patch printing is performed at step S215. At this step, some patch patterns are printed with different coefficient values. Then, at step S220, an optimum value of coefficient α2 in secondary-color patch printing is determined. In the same manner, tertiary-color patch printing is performed at step S225, and an optimum value of coefficient α3 in tertiary-color patch printing is determined at step S230. Thus, optimum values of coefficients α2 and α3 are entered. Once the above processing is completed, it will remain effective until the print head 31a is replaced.

As to the processing at steps S215 to S230, it is required to determine optimum values of coefficients α2 and α3. It is found empirically that an optimum value of coefficient α2 is "0.8" and an optimum value of coefficient α3 is "0.6". Using these coefficient values as default values, satisfactorily advantageous results of print data adjustment may be attained. Therefore, if each predetermined corresponding value can be entered after single-color patch printing through steps S205 and S210 at least, it is allowed to skip over the processing of steps S215 to S230.

In case that the printer driver 21b is started initially, the above-mentioned printing and entry operations are carried out and then color conversion table write processing is performed at step S240. That is, a degree of adjustment for each color in the color conversion table is reduced according to equation (1) or (2), and then each conversion value attained through calculation is rewritten into the color conversion table.

Thereafter, RGB print data prepared on the application software 21d is color-converted into CMYK print data at step S250. At this step, the color conversion table containing degree-of-adjustment data determined at S240 is used, and any necessary adjustment is made simultaneously with color conversion.

At the point of time when color conversion is completed, print data is still in a form of 256-level gradation data. Then, at step S255, it is converted into a form of two-level gradation print data acceptable to the printer 31, and the converted two-level gradation print data is then output onto the printer 31. In case that the printer 31 receives the above two-level gradation print data, the correction lookup table has an optimum degree of reduction in the vicinity of each reference color. Thus, desirable printing without color inconsistency is possible as in printing with the reference print head 31a.

Where ejection of color ink or any other recording material for forming dots on such a printer as the ink-jet printer 31 varies due to an instrumental error, it is practically infeasible to set up a degree of adjustment for correcting inconsistency in each color. As mentioned above, however, by predetermining a degree of adjustment for single color at least, judging a mixed-color order for each dot, and reducing the degree of adjustment for each color as the mixed-color order increases, color adjustment can be carried out according an optimum degree of adjustment corresponding to each dot mixed-color order so as to compensate for an instrumental error, thus making it possible to improve color reproducibility.

Then, the following describes a second preferred embodiment of the present invention.

Figure 19:
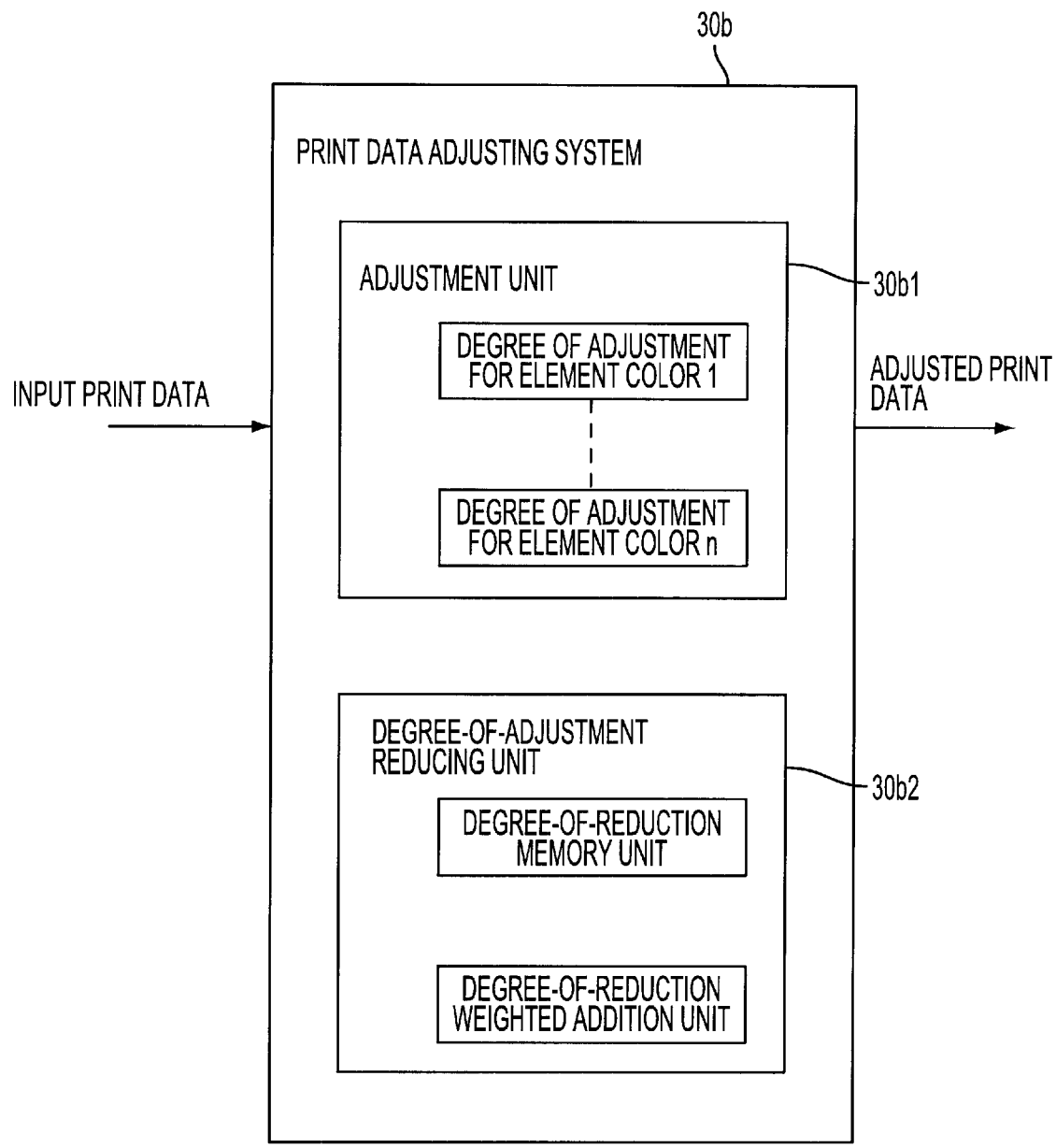
FIG. 19 is a general application diagram showing a print data adjusting system in another preferred embodiment of the present invention.

FIG. 19 shows a general application diagram of a print data adjusting system in the second preferred embodiment of the present invention.

In the present preferred embodiment, a print data adjusting system 30b receives input print data generated through a print data generating process carried out in a printing system arrangement, and performs predetermined print data adjustment to deliver output of adjusted print data. In this case, second adjustment unit 30b1 retains a degree of adjustment per element color for correcting an instrumental error as described later, and according to the degree-of-adjustment decreasing instruction given by degree-of-adjustment reducing unit 30b2, the degree of adjustment per element color is decreased to perform print data adjustment. This processing sequence is explained in detail below.

Figure 20:
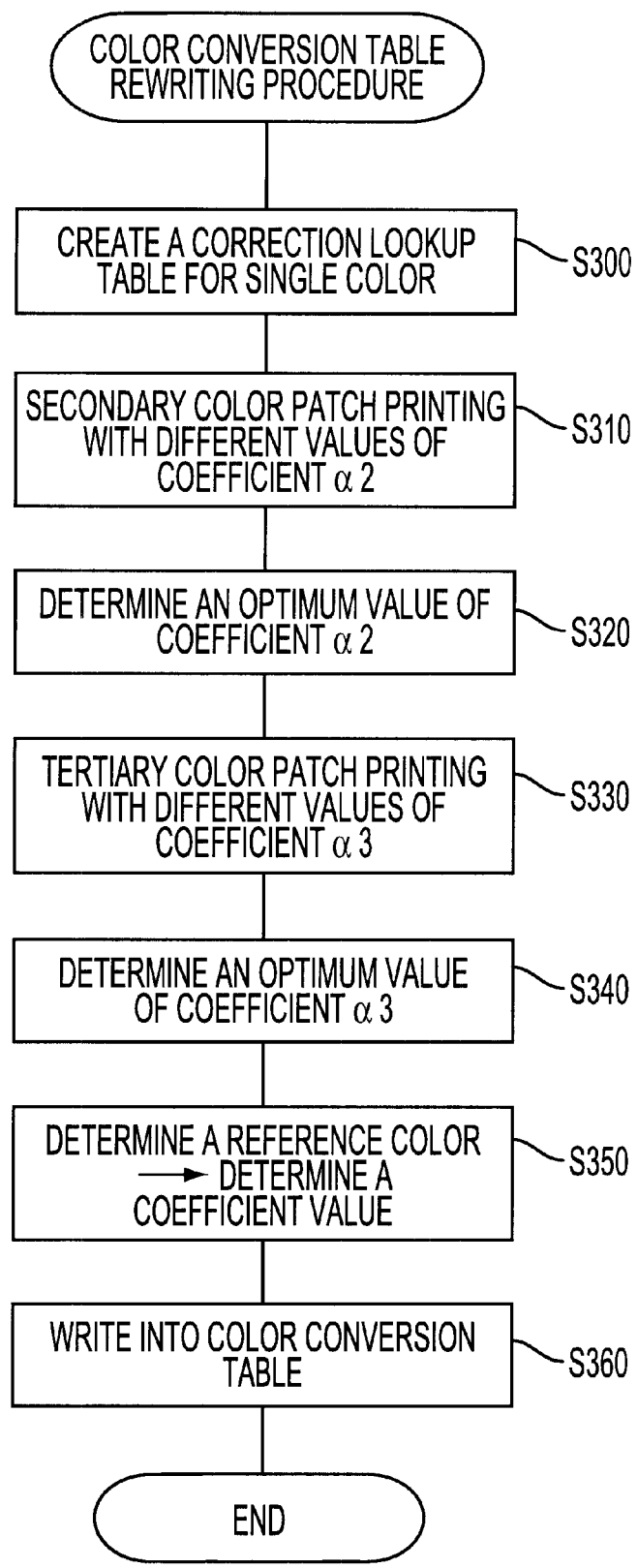
FIG. 20 is a flowchart showing a color conversion table rewriting procedure.

Referring to FIG. 20, there is shown a color conversion table rewriting procedure which is performed as color conversion processing in print data adjustment. Described below are steps of the color conversion table rewriting procedure.

Steps S300 to S340 are the same as steps S100 to S140 in the first preferred embodiment. Following step S340, the processing at step S350 is carried out.

While optimum coefficient values are provided for primary, secondary and tertiary colors, print data contains a variety of primary, secondary and tertiary colors. Therefore, it is advantageous to adjust a coefficient value depending on which dimension is to be treated as an important factor in color reproduction. At step S350, a reference color to be treated as an important factor in color reproduction is determined selectively, and a coefficient value is determined accordingly. For instance, if a reference secondary color is determined selectively, then a coefficient value "α=0.8" is determined. If a reference tertiary color is determined selectively, then a coefficient value "α=0.6" is determined. As a matter of course, a coefficient value may also be determined using equation (1) as in the case shown in FIG. 14.

Figure 21:
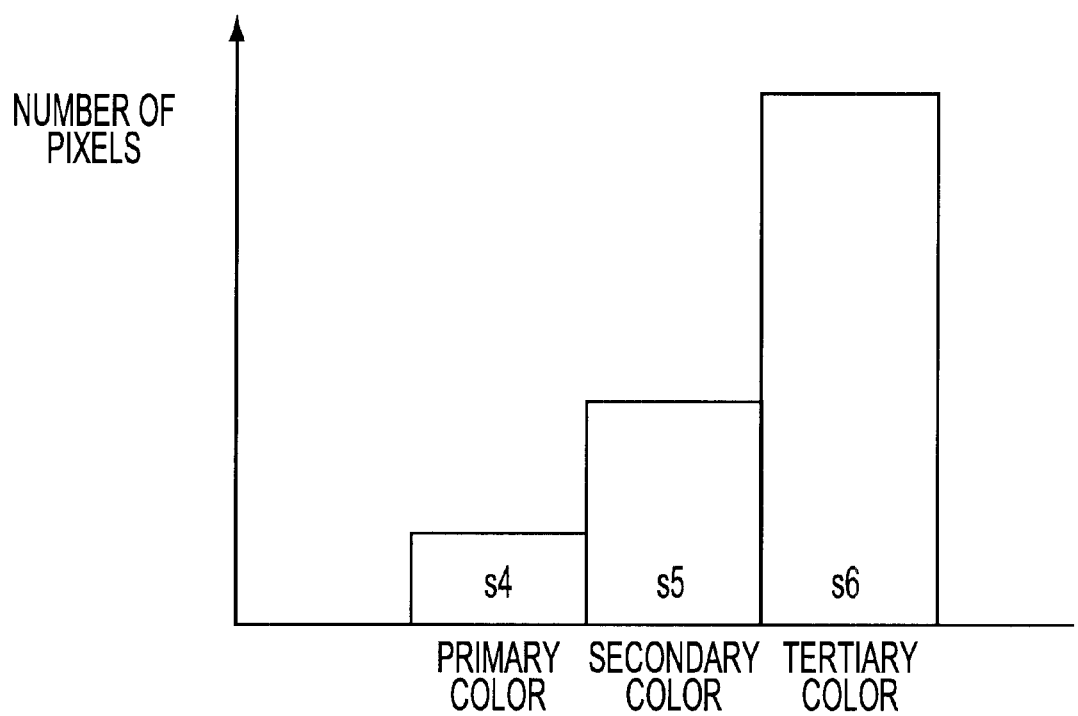
FIG. 21 is a histogram showing an instance where coefficients are determined according to pixel distribution ratio.

Although a reference color is determined selectively and then a coefficient value is determined according to the determined reference color in this example, there may also be provided such a procedure that a coefficient value is determined by counting the number of pixels of actual primary, secondary and tertiary colors. FIG. 21 shows the result of counting the number of pixels of primary, secondary and tertiary colors with respect to all the pixels of print data. According to this counting result, a weight value is assigned to each coefficient. In the example shown in FIG. 21, the number of pixels of primary color is indicated as s4, the number of pixels of secondary color is indicated as s5, and the number of pixels of tertiary color is indicated as s6. Hence, in a ratio of the number of pixels (S=s4+s5+s6), each coefficient is weighted and addition is performed as expressed below:

$$\alpha 20 = 1.0 \times (s4/S) + \alpha 2 \times (s5/S) + \alpha 3 \times (s6/S) \qquad (3)$$

A value of coefficient α20 thus attained is used. On the other hand, in a situation where an element color component contains just a small quantity of any other element color component mixedly, if it is judged to be secondary or tertiary color, the number of pixels of primary or secondary color is decreased substantially. However, in such a case, even if a degree of adjustment is increased to some extent, an adverse effect will occur scarcely since just a small quantity of other element color component is mixed. Therefore, it is also advantageous to provide such an arrangement that a judgment is formed on identification of secondary or tertiary color only in a mixed-color condition where the quantity of other mixed element color component is relatively significant.

Figure 22:
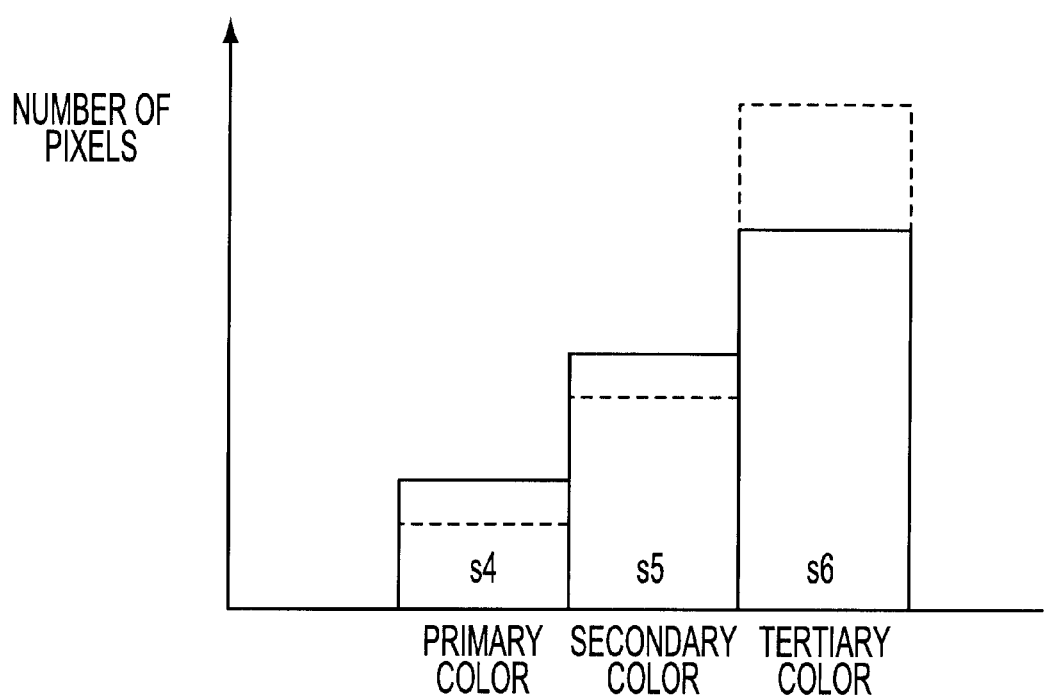
FIG. 22 is a histogram for pixel distribution ratio, showing an example where a threshold value is used in calculation.

As an example, FIG. 22 shows the result of counting the number of pixels of primary, secondary and tertiary colors in case of a judgment based on a ratio of element color components. In this example, element colors having a compositional value of 20% or less with respect to the maximum compositional value are ignored. Resultantly, the number of pixels of primary color and the number of pixels of secondary color are increased, causing an effect on determination of a value of coefficient α20.

As mentioned above, where the number of pixels of print data is counted and the result of counting is reflected, an optimum coefficient value for each of primary, secondary and tertiary colors is attained. In this case, degree-of-reduction memory unit is implemented in hardware/software for storing optimum coefficient values of primary, secondary and tertiary colors, and degree-of-reduction weighted addition unit is implemented for counting the number of pixels of each of primary, secondary and tertiary colors in actual print data and carrying out weighted addition.

In color adjustment, a correction lookup table may be referenced for CMYK print data. However, since a color conversion table is also referenced for RGB-to-CMYK color conversion, it is advantageous to rewrite the color conversion table so that color adjustment can be accomplished through single table reference. For this purpose, at step S360, the contents of a correction lookup table retaining determined coefficient values are written into the color conversion table. The degree-of-adjustment reducing unit 30b2 is implemented for determining coefficient values according to reference color and writing a degree of adjustment multiplied by each coefficient value into the color conversion table in the manner mentioned above.

Figure 23:
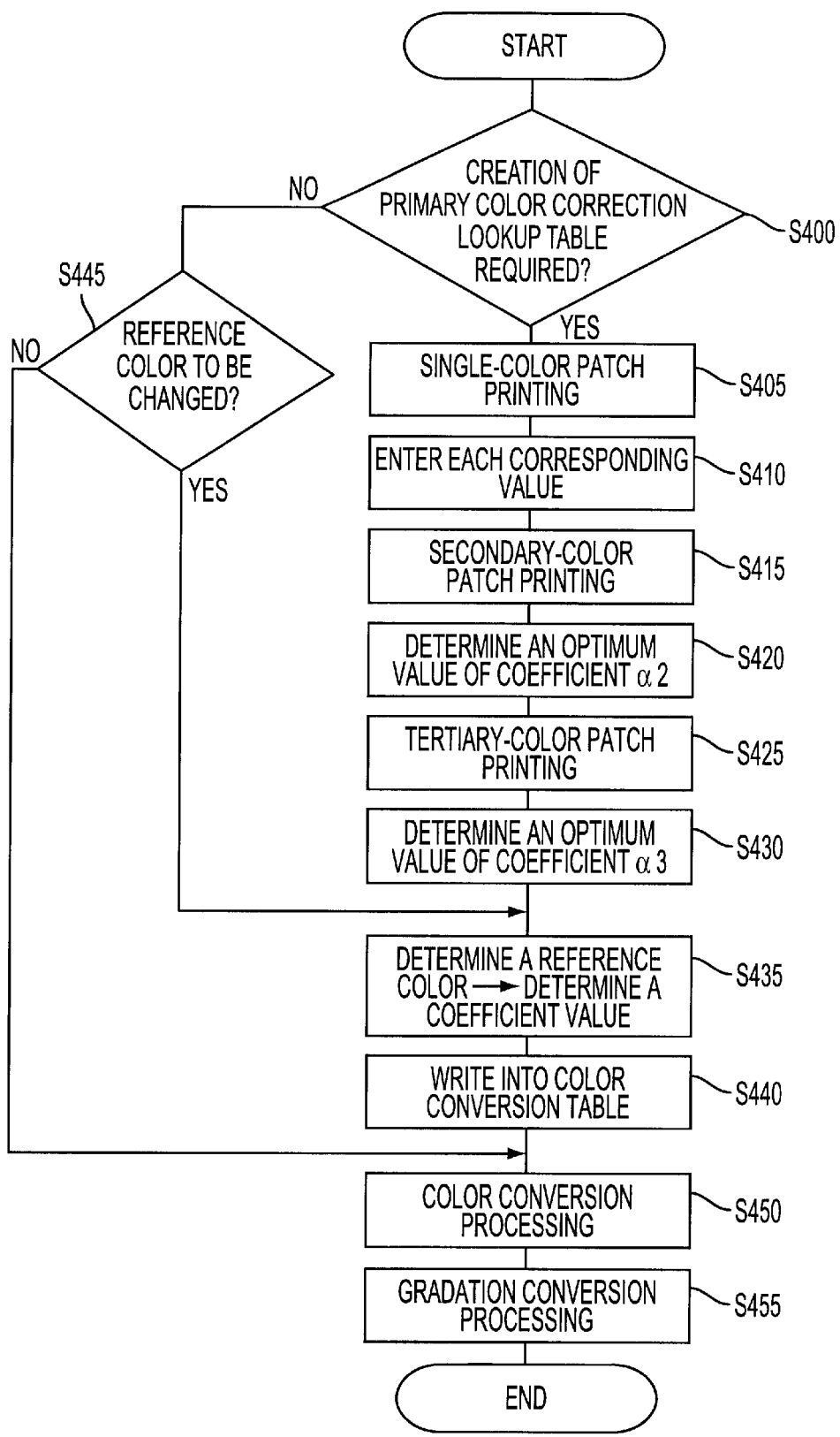
FIG. 23 is a flowchart showing operations of a second printer driver.

In the present preferred embodiment, the procedure explained above is also carried out when the printer driver 21b is run on the computer 21. With particular reference to FIG. 23, the following describes the operational flow of the printer driver 21b in the present preferred embodiment.

When the printer driver 21b is started initially in the present preferred embodiment, patch printing and entry of optimum values of coefficients $\alpha 2$ and $\alpha 3$ are also performed at steps S400 to S430 in the same manner at step S200 to S230.

In case of the initial startup of the printer driver 21b, after the above patch printing and entry of optimum coefficient values are performed, a reference color is determined selectively and then a corresponding coefficient is determined at step S435. Thereafter, color conversion table write processing is performed at step S440.

Execution of steps S435 and S440 is required when the reference color is to be changed. If it is judged at step S400 that creation of a primary color correction lookup table is not required, a judgment is formed at step S445 as to whether the reference color is to be changed or not. Then, if it is necessary to change the reference color, steps S435 and S440 are put into execution.

Thereafter, RGB print data prepared on the application software 21d is color-converted into CMYK print data at step S250. At this step, the color conversion table containing degree-of-adjustment data determined at step S440 is used, and any necessary adjustment is made simultaneously with color conversion.

At the point of time when color conversion is completed, print data is still in a form of 256-level gradation data. Then, at step S455, it is converted into a form of two-level gradation print data acceptable to the printer 31, and the converted two-level gradation print data is then output onto the printer 31. In case that the printer 31 receives the above two-level gradation print data, the correction lookup table has an optimum degree of reduction in the vicinity of each reference color. Thus, desirable printing without color inconsistency is possible as in printing with the reference print head 31a.

Where ejection of color ink or any other recording material for forming dots on such a printer as the ink-jet printer 31 varies due to an instrumental error, it is practically infeasible to set up a degree of adjustment for correcting inconsistency in each color. As mentioned above, however, by determining a degree of adjustment for single color at least, determining a reference color selectively, and reducing the degree of adjustment for each color according to the optimum degree of reduction, satisfactory color adjustment can be carried out readily even for secondary and tertiary color printing.

What is claimed is:

1. For use with a printing apparatus which deposits element color recording materials in dot matrices on recording media to produce printed output of color images containing a plurality of element colors according to print data, a print data adjusting system arranged for adjusting said print data to compensate for color variation due to inconsistency in quantity of recording materials used, characterized in that a predetermined degree of adjustment, for compensating for inconsistency in quantity of each single color used due to an instrumental error of the printing apparatus, is decreased according to a mixed-color order of each dot at the time of color mixing to accomplish adjustment of said print data.

2. For use with a printing apparatus which deposits element color recording materials in dot matrices on recording media to produce printed output of color images containing a plurality of element colors according to print data, a print data adjusting system arranged for adjusting said print data to compensate for color variation due to inconsistency in quantity of recording materials used, comprising:

a degree-of-adjustment memory unit for storing a predetermined degree of adjustment for compensating for inconsistency in quantity or recording material used for each element color;

a degree-of-adjustment regulating unit for judging a mixed-color order for each dot and regulating the degree of adjustment to decrease to a level lower than in single-color printing when the mixed-color order becomes higher; and a first adjustment unit for adjusting said print data according to the degree of adjustment thus regulated wherein the predetermined degree of adjustment is decreased at the time of color mixing to accomplish the adjustment of the print data.

3. A print data adjusting system as claimed in claim 2, wherein said degree-of-adjustment regulating unit is arranged to judge variation in compositional quantity of each element color and recognize that a mixed-color order has the highest value in case of uniform distribution.

4. A print data adjusting system as claimed in claim 3, wherein said degree-of-adjustment regulating unit is arranged to judge variation in compositional quantity of each element color in accordance with a ratio of the lowest level of compositional quantity of each element color to an average value of compositional quantities of respective element colors.

5. A print data adjusting system as claimed in claim 2, wherein said degree-of-adjustment regulating unit is arranged to judge saturation and recognize that a mixed-color order is high if saturation is low.

6. A print data adjusting system as claimed in any one of claims 2 to 5, wherein said degree-of-adjustment regulating unit is arranged to judge a mixed-color order per dot of said print data and determine a degree of regulation for each degree of adjustment.

7. A print data adjusting system as claimed in any one of claims 2 to 5, wherein said degree-of-adjustment regulating unit is arranged to determine a degree of regulation in advance for each degree of adjustment in accordance with combinations of respective element colors.

8. A print data adjusting system as claimed in claim 2, characterized by:

second adjustment unit for adjusting said print data in accordance with a predetermined degree of adjustment for compensating for inconsistency in quantity of recording material used for each element color; and degree-of-adjustment reducing unit for decreasing the degree of adjustment effected by the second adjustment unit to a level lower than in single-color printing at the time of color mixing through combinations of element colors.

9. A print data adjusting system as claimed in claim 8, wherein said degree-of-adjustment reducing unit is arranged to decrease each degree of adjustment as the number of mixed colors increases.

10. A print data adjusting system as claimed in claim 8 or 9, wherein said degree-of-adjustment reducing unit includes:

degree-of-reduction memory unit for storing an optimum degree of reduction for a particular number of mixed colors; and degree-of-reduction weighted addition unit for counting the number of mixed color pixels and performing addition on each degree of reduction using a weight value corresponding to the number of pixels.

11. For use with a printing apparatus which deposits element color recording materials in dot matrices on recording media to produce printed output of color images containing a plurality of element colors according to print data, a method of adjusting said print data, characterized in that a predetermined degree of adjustment, for compensating for inconsistency in quantity of each single color used due to an instrumental error of the printing apparatus, is decreased according to a mixed-color order of each dot at the time of color mixing to accomplish adjustment of said print data.

12. A method of adjusting print data as claimed in claim 11, wherein a predetermined degree of adjustment for compensating for inconsistency in quantity of recording material used for each element color is set up, and the degree of adjustment is decreased to a level lower than in single-color printing at the time of color mixing through combinations of element colors to accomplish adjustment of said print data.

13. For use with a printing apparatus which deposits element color recording materials in dot matrices on recording media to produce printed output of color images containing a plurality of element colors according to print data, a method of adjusting the print data, wherein a predetermined degree of adjustment, for compensating for inconsistency in quantity of each single color used, is decreased at the time of color mixing to accomplish adjustment of said print data; wherein a predetermined degree of adjustment for compensating for inconsistency in quantity of recording material used for each element color is stored, a mixed-color order for each dot is judged, the degree of adjustment is regulated to decrease to a level lower than in single-color printing when the mixed-color order becomes higher; and wherein said print data is adjusted in accordance with the degree of adjustment thus regulated.

14. For use with a printing apparatus which deposits element color recording materials in dot matrices on recording media to produce printed output of color images containing a plurality of element colors according to print data, a software storage medium containing a print data adjusting program designed for adjusting said print data to compensate for color variation due to inconsistency in quantity of recording materials used, characterized in that a predetermined degree of adjustment, for compensating for inconsistency in quantity of each single color used due to an instrumental error of the printing apparatus, is decreased according to a mixed-color order of each dot at the time of color mixing to accomplish adjustment of said print data.

15. A software storage medium containing a print data adjusting program as claimed in claim 14, wherein a predetermined degree of adjustment for compensating for inconsistency in quantity of recording material used for each element color is set up, and the degree of adjustment is decreased to a level lower than in single-color printing at the time of color mixing through combinations of element colors to accomplish adjustment of said print data.

16. A software storage medium containing a print data adjusting program as claimed in claim 14, wherein a predetermined degree of adjustment for compensating for inconsistency in quantity of recording material used for each element color is stored, a mixed-color order for each dot is judged, the degree of adjustment is regulated to decrease to a level lower than in single-color printing when the mixed-color order becomes higher, and said print data is adjusted in accordance with the degree of adjustment thus regulated.

* * * * *

UNITED STATES PATENT AND TRADEMARK OFFICE
CERTIFICATE OF CORRECTION

PATENT NO. : 6,621,594 B1
DATED : September 16, 2003
INVENTOR(S) : Naoki Kuwata and Takashi Maruyama It is certified that error appears in the above-identified patent and that said Letters Patent is hereby corrected as shown below:

<u>Title page,</u>
Item [54], Title, should read as follows:
-- [54]  PRINT DATA ADJUSTING SYSTEM, PRINT DATA ADJUSTING METHOD, AND SOFTWARE STORAGE MEDIUM CONTAINING PRINT DATA ADJUSTING PROGRAM --

Signed and Sealed this

First Day of June, 2004

JON W. DUDAS
*Acting Director of the United States Patent and Trademark Office*